US011399290B2

(12) United States Patent
Mahalingam et al.

(10) Patent No.: US 11,399,290 B2
(45) Date of Patent: Jul. 26, 2022

(54) METHOD AND APPARATUS FOR MONITORING AND PREDICTING CAPACITY UTILIZATION AND PREEMPTIVELY RECONFIGURING THE NETWORK IN A SPECTRUM CONTROLLED NETWORK

(71) Applicant: Celona, Inc., Cupertino, CA (US)

(72) Inventors: Nagi Mahalingam, San Diego, CA (US); Mark Jan Dijkstra, Brooklyn, NY (US); Sourav Bandyopadhyay, Liluah Howrah (IN)

(73) Assignee: Celona, Inc., Cupertino, CA (US)

( * ) Notice: Subject to any disclaimer, the term of this patent is extended or adjusted under 35 U.S.C. 154(b) by 89 days.

(21) Appl. No.: 16/919,016

(22) Filed: Jul. 1, 2020

(65) Prior Publication Data
US 2022/0007199 A1 Jan. 6, 2022

(51) Int. Cl.
*H04W 16/14* (2009.01)
*H04W 72/04* (2009.01)
(Continued)

(52) U.S. Cl.
CPC ............ *H04W 16/14* (2013.01); *G06N 20/00* (2019.01); *H04W 4/022* (2013.01);
(Continued)

(58) Field of Classification Search
CPC ................. H04W 16/14; H04W 4/022; H04W 28/0942; H04W 48/16; H04W 72/0453; H04W 88/08; G06N 20/00
See application file for complete search history.

(56) References Cited

U.S. PATENT DOCUMENTS

2014/0128005 A1* 5/2014 Beattie .................. H04W 24/10
455/67.11
2018/0234320 A1* 8/2018 Paulraj .............. H04W 28/0268
(Continued)

OTHER PUBLICATIONS

Horwitz, Jeremy, "U.S. Funds AI Project to Enable Millisecond-Level 5G Spectrum Sharing", May 27, 2020, 1 pg.
(Continued)

*Primary Examiner* — Dady Chery
(74) *Attorney, Agent, or Firm* — Jaquez Land Greenhaus & McFarland LLP; Bruce W. Greenhaus, Esq.

(57) ABSTRACT

A method and apparatus for predicting capacity utilization and preemptively reallocating channels in a spectrum-controlled network such as a Citizen's Band Radio Service (CBRS) network. The network includes a plurality of Base Stations/Access Points (BS/APs) which monitor RF resource usage of the channels at each BS/AP and provide time series data relating to capacity utilization over a period of time. The data is analyzed, and patterns are identified in the collected capacity utilization data using Artificial Intelligence (AI) techniques. Looking forward, capacity utilization is predicted using AI techniques. Responsive to the capacity utilization predictions, the channels pre-emptively reallocated among BS/APs. The enterprise network provides feedback regarding prediction accuracy, which is utilized in a machine learning process to modify the models and provide greater prediction accuracy. The prediction apparatus includes a capacity utilization module and a training/retraining module, which may be located remotely from the enterprise network.

13 Claims, 14 Drawing Sheets

(51) Int. Cl.
*H04W 88/08* (2009.01)
*H04W 4/021* (2018.01)
*G06N 20/00* (2019.01)
*H04W 48/16* (2009.01)
*H04W 28/08* (2009.01)

(52) U.S. Cl.
CPC ....... *H04W 28/0942* (2020.05); *H04W 48/16* (2013.01); *H04W 72/0453* (2013.01); *H04W 88/08* (2013.01)

(56) References Cited

U.S. PATENT DOCUMENTS

| | | | |
|---|---|---|---|
| 2020/0259896 A1* | 8/2020 | Sachs | H04L 63/0823 |
| 2021/0058936 A1* | 2/2021 | Gordaychik | H04W 72/0453 |
| 2021/0344612 A1* | 11/2021 | Files | G06Q 10/1095 |
| 2022/0007198 A1 | 1/2022 | Mahalingam et al. | |

OTHER PUBLICATIONS

Wireless Innovation Forum, "Citizens Broadband Radio Service (CBRS): Spectrum Access System (SAS)—Citizens Broadband Radio Service Device (CBSD) Interface Technical Specification", Document WINNF-TS-0016, Version V1.2.5, May 18, 2020, 60 pgs.

Wireless Innovation Forum, "Requirements for Commercial Operation in the U.S. 3550-3700 MHz Citizens Broadband Radio Service Band", Document WINNF-TS-0112, Version V1.9.1, Mar. 11, 2020, 81 pgs.

Beamer, Temica M., Office Action received from the USPTO dated Jan. 21, 2022 for U.S. Appl. No. 16/919,006, 11 pgs.

* cited by examiner

METHOD AND APPARATUS FOR MONITORING AND PREDICTING CAPACITY UTILIZATION AND PREEMPTIVELY RECONFIGURING THE NETWORK IN A SPECTRUM CONTROLLED NETWORK

CROSS-REFERENCE TO RELATED APPLICATION

The present application is related to U.S. application Ser. No. 16/919,006 entitled "Method and Apparatus for Monitoring and Predicting Channel Availability and Preemptively Reconfiguring the Network in a Spectrum Controlled Network" filed on even date herewith, the disclosure of which is incorporated herein by reference in its entirety.

BACKGROUND

Technical Field

The disclosed method and apparatus relate to wireless communications networks and more particularly to methods and apparatus for predicting capacity utilization in the Base Stations/Access Points (BS/APs) of an enterprise network that is subject to spectrum control such as a Citizen's Broadband Radio Service (CBRS), and preemptively reconfiguring the network responsive to the capacity utilization predictions.

BACKGROUND

Enterprises are increasingly integrating wireless digital solutions into their business structure and implementing them within their business location, and have thus created a huge demand for computing resources, data storage and networking infrastructure for the purpose of supporting optimal performance of their business applications. To this end, wireless network systems are being developed to make more effective use of the spectrum within a business enterprise for wireless communication, in order to improve and expand communication capabilities within the organization and between the organization and the external entities. These improved communication capabilities increase business efficiency and reduce costs, and accordingly, the wireless industry has experienced tremendous growth in recent years.

Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

As will be discussed herein, one type of wireless communication network that has recently become available for general use within business enterprise locations is a CBRS network, which utilizes the CBRS radio band of 3550-3700 MHz, nominally divided into fifteen channels of 10 MHz each. In order to make this spectrum available, however, certain prior users (including the military) have been given a higher priority to access the spectrum. In order to implement this system, and ensure that certain users are given higher priority, use of this radio band is subject to spectrum control by a Spectrum Access System (SAS). Any enterprise implementing a CBRS network must follow the directions given by the SAS, such as which channels it can use, how much power it can transmit, and previously authorized channels may be suspended by the SAS.

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE' refers to a wide range of user_devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

CBRS Networks

Recently, the US Federal Government finalized rules (Rule 96) that allow general access to an area of the frequency spectrum referred to as the (Citizen's Broadband Radio Service) CBRS. CBRS, which is a key element of an advanced communication network referred to as "5G", operates in a 150 MHz wide frequency range from 3.55 GHz to 3.7 GHz. The CBRS rules set forth detailed requirements for the devices that operate in a CBRS network and how they communicate. CBRS supports both LTE and 5G devices. Base stations within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR). For CBSDs that comprise multiple nodes or networks of nodes, CBSD requirements apply to each node, even if network management and communication with a Spectrum Access System (SAS) is accomplished via a single network interface.

The CBRS rules require that a Spectrum Access System (SAS) allocate spectrum to the CBSDs to avoid interference within the CBRS band. The SAS is a service, typically cloud-based, that manages the spectrum used in wireless communications of devices transmitting in the CBRS band, in order to prevent harmful interference to higher priority users such as the military and priority licensees. A CBRS device (CBSD) needs authorization from the SAS before starting to transmit in the CBRS band.

Generally, the SAS authorizes and manages use of spectrum for the CBRS. More specifically, the SAS maintains records of all authorized services and CBSDs in the CBRS frequency bands, is capable of determining the available channel at a specific geographic location, provides information on available channels to CBSDs that have been certified under the Commission's equipment authorization procedures, determines and enforces maximum power levels for CBSDs, enforces protection criteria for Incumbent Users and Priority Access Licensees, and performs other functions as set forth in the Federal Communications Commission (FCC) rules.

Regardless of complexities introduced due to spectrum control, the CBRS band provides an opportunity to create new wireless networks, and there is a desire for utilizing and making optimum use of spectrum in the CBRS band while following the rules pertaining to CBRS usage.

Communications and Messaging Between the CBSDs and the SAS

Each CBSD in the network must follow the direction provided by the SAS, as per the rules, in order to operate within a CBRS network and avoid interference with other CBSDs outside the network, as well as to prevent interference with nearby Priority Access License (PAL users) and military activities in the CBRS band. To maintain communication between the CBSDs and the SAS, a series of messages are exchanged between the SAS and the CBSD (or Domain Proxy). These message exchanges are for purposes including registration, spectrum inquiry, grant, and heartbeat response. The messages may be exchanged directly between each CBSD and the SAS; however, when a network includes multiple CBSDs, a Domain Proxy (DP) may be implemented, which is a unit that represents one or more CBSD(s) to the SAS.

FIG. 2 is a block diagram that shows a Domain Proxy 201 connected between a plurality of CBSDs 203 and a SAS 207. When a Domain Proxy is implemented, it manages all transactions between the CBSDs and the SAS by proxying the messages and facilitating functions such as channel arbitration, proxied heartbeat responses, and so forth. In other words, in a network that has multiple CBSDs 203, the DP 201 is connected to each of the CBSDs to act as a proxy for all SAS transactions and convey all messages pertaining to the SAS-CBSD interface 209 for client CBSDs 203. Particularly, the DP 201 manages all the transactions by proxying the messages and facilitating functions such as channel arbitration, proxied heartbeat responses, interference coordination, and so forth. Advantageously the DP 201 presents a consistent and secure interface to the SAS 207, and in large enterprise deployments, a DP 201 may be deployed to minimize the high count of SSL/TLS connections that would otherwise be required for individual CBSDs. Alternatively, the CBRS rules do allow an individual CBSD such as the CBDS 205 connected to communicate directly with the SAS 207, as shown, and this may be useful for some implementations.

The Spectrum Sharing Committee Work Group 3 (for CBRS Protocols) has established an interface specification for registering a CBSD with an SAS, requesting a grant of spectrum, and maintaining that grant. These message flows are described in the document titled "Signaling Protocols and Procedures for Citizens Broadband Radio Service (CBRS): Spectrum Access System (SAS)-Citizens Broadband Radio Service Device (CBSD) Interface Technical Specification", Document WINNF-TS-0016-V1.2.4. 26 Jun. 2019. The interface specifications are subject to continuing development, and it is likely that subsequent versions of the interface specification and this document will be developed and published. Newer versions of the SAS are expected to support older versions of Domain Proxies and CBSDs, in a backwards compatible manner.

As discussed above, in CBRS, the spectrum in use is arbitrated and managed by an SAS, which periodically synchronizes with an FCC-approved spectrum database to determine usage of channels in each geography. The SAS may also enlist the help of an external ESC (environmental sensing capability) system [See WINNF-TS-0112] which monitors and determines dynamic changes in the radio environment. For example, with the aid of an ESC, the SAS may become aware of an approaching naval vessel actively using a portion of the CBRS spectrum well before the naval vessel can cause interference in the networks that the SAS is directing. For example, the ESC may detect when a naval vessel arrives approximately 100 miles away from the coast, and if the naval vessel is an incumbent that has preferential access to the spectrum (which is typical), the SAS is obligated to send a "suspend" or "terminate" order to the CBSDs using that portion of the CBRS spectrum. In CBRS, both "Suspension" and "Termination" mandate the CBSDs to cease transmissions on the previously granted spectrum within 60 seconds, and the CBSD must comply.

In some implementations multiple CBSDs are proxied to the SAS via a Domain Proxy that communicates with the SAS and may receive the suspension or termination order for one or more grants for one or more CBSDs. In this implementation, the Domain Proxy may seek new grants to replace the suspended/terminated grants and apply them to the impacted CBSDs, and the Domain Proxy must ensure the impacted CBSDs cease transmission on the suspended/terminated grants within 60 seconds of the command.

Typically, in an enterprise network, there may be several, and often more, CBSDs operating on a limited portion of the CBRS spectrum. As an example, there may be M CBSDs operating on N channels, N<<M. To ensure neighboring CBSDs in the network are not on the same channel, the enterprise may employ Self-Organizing Network (SON) capability to algorithmically determine the channels a specific CBSD may need to operate on given its proximity (radio or geographic) to one or more neighboring CBSDs. Thus, given N channels and M CBSDs, optimal solutions exist to distribute the N channels across the M CBSDs while minimizing total power within the enterprise and controlling total interference measurable on any channel.

In the provisioning process, each of the CBSDs in the network is assigned one or more channels, each having a specific capacity. The assignments are generally based upon some expectations of the capacity that will be needed. However, during operation over the course of a day or more, there may be times at which the radio frequency (RF) resources needed by a particular CBSD may approach, or even exceed, its capacity. In such cases the UEs attached to the CBSD may have their services reduced, or even dropped. Conversely, if the UE is only using a small portion of its RF resources, then those resources could likely be better used elsewhere in the network. It would be an advantage to accurately predict the RF resources that will be needed by a particular CBSD over a period of time such as over the course of a day or week, and preemptively assign the resources as predicted to provide continuous uninterrupted service.

SUMMARY

Methods and apparatus are disclosed herein for predicting capacity utilization in a spectrum-controlled network and reconfiguring the network accordingly. The method and apparatus are particularly useful in a CBRS network, which has recently become available for general use at business enterprise locations.

Various embodiments for utilization of capacity and pre-emptively re-allocating channels in a spectrum-controlled wireless communication network and reconfiguring the network responsive to the predictions are disclosed. The wireless network includes a plurality of Base Stations/Access Points (BS/APs) located within an enterprise location and forming part of an enterprise network. The BS/APs communicate with a plurality of User Equipment devices (UEs) on a plurality of wireless channels granted by a spectrum control entity. The channels are provisioned among the BS/APs in the network. The BS/APs communicate with the enterprise network, which provides network administration and other services, and connects the UEs and BS/APs with other networks.

In one method, the radio frequency (RF) usage in each of the BS/APs is monitored over a period of time and time series RF usage data is collected. Capacity utilization data for each of the BS/APs is determined responsive to the RF usage data and the channels provisioned respectively to each of the BS/APs. Patterns in the capacity utilization data are identified using Artificial Intelligence (AI) techniques, and responsive to the identified patterns, utilization of capacity for each of the BS/APs is predicted over a prediction time period using AI techniques. Responsive to the capacity utilization predictions, the network channels are re-organized to provide a network configuration plan that re-distributes the channels over the prediction time period. Network channels are preemptively reallocated responsive to the network configuration prior to the prediction time period, to reconfigure the network to efficiently utilize capacity during the prediction time period. In some embodiments, predicting capacity utilization includes predicting a capacity utilization over each of a plurality of time slots, and the step of pre-emptively reallocating network channels includes reallocating the channels in the plurality of time slots.

In some embodiments, predicting utilization of capacity includes generating models that are used to make predictions, and also includes providing feedback data regarding prediction accuracy, and utilizing the feedback data in a machine learning process to modify the models and thereby provide greater prediction accuracy.

In some embodiment the wireless network operates on the Citizen's Broadband Radio Service (CBRS band), and the BS/APs comprise CBRS Devices (CBSDs) that are located at the enterprise location and form part of an enterprise network, and the spectrum control entity is a Spectrum Access System (SAS).

Described herein is an apparatus for predicting utilization of capacity and allocating channels in a spectrum-controlled wireless communication network that includes a plurality of Base Stations/Access Points (BS/APs) located within an enterprise location of an enterprise network. The BS/APs communicate with a plurality of User Equipment devices (UEs) on a plurality of wireless channels. The apparatus includes a capacity utilization database for storing data regarding capacity utilization at the enterprise location and a capacity forecasting module including Artificial Intelligence (AI). The capacity forecasting module is connected to the capacity utilization database and configured to identify patterns in the capacity utilization data and predict capacity utilization responsive to the identified patterns. A self-organizing network element is connected to receive the capacity utilization predictions, and configured to reorganize the channels among the BS/APs responsive to their predicted capacity utilization, to provide a network reconfiguration plan predicted to efficiently utilize capacity during the prediction time period. A domain proxy is configured receive the network reconfiguration plan and pre-emptively re-allocate channels among the BS/APs responsive to the network reconfiguration. In some embodiments the capacity forecasting module is configured to predict capacity utilization over each of a plurality of time slots.

In some embodiments the capacity utilization module is configured to generate models that are used to make predictions, and includes a Training/Retraining Module including machine learning configured to receive feedback data regarding prediction accuracy and utilize the feedback data to modify the models and thereby provide greater prediction accuracy.

In some embodiments the capacity utilization module may be located remotely from the enterprise location.

The method and apparatus for predicting capacity utilization may be performed remotely. A centralized provider network is provided to allocate channels in a plurality of spectrum-controlled wireless communication networks, each wireless communication network including a plurality of Base Stations/Access Points (BS/APs) communicating with a plurality of User Equipment devices (UEs) on a plurality of wireless channels at an enterprise location. The method includes receiving utilization of capacity time series data from each of the enterprise networks, analyzing the data using AI techniques to determine capacity utilization patterns as a function of geographical location, predicting capacity utilization respectively for the BS/APs at the enterprise locations responsive to the capacity utilization patterns using AI techniques, including predicting capacity utilization for the BS/APs over a prediction time period using AI techniques. The predicted capacity utilization information is provided respectively to each of the enterprise networks for reconfiguring their networks to efficiently utilize capacity during the prediction time period. In each of the networks, network channels may be reorganized responsive to the predicted capacity utilization to provide a reconfigured network plan; and then the channels are pre-emptively re-allocated responsive to the reconfigured network plan. In some embodiments capacity utilization is over each of a plurality of time slots, and pre-emptively reallocating network channels includes reallocating the channels in the plurality of time slots.

In some embodiments, predicting capacity utilization includes generating models that are used to make predictions, and further includes receiving feedback data from the wireless communication networks regarding prediction accuracy, and utilizing the feedback data in a machine learning process to modify the models and thereby provide greater prediction accuracy.

Each of the wireless communication networks operate on the Citizen's Broadband Radio Service (CBRS) band, and the BS/APs comprise CBRS Devices (CBSDs) that are located at an enterprise location and form part of an enterprise network.

The apparatus for predicting capacity utilization to allocate channels in a plurality of spectrum-controlled wireless communication networks includes a centralized provider network connected to communicate and exchange information with each of the enterprise networks. The centralized provider network includes a central repository database for storing data from each of the enterprise networks regarding capacity utilization of its BS/APs; and a global capacity forecasting module including Artificial Intelligence (AI), the module connected to the central repository database and configured to identify patterns in the capacity utilization data of each BS/AP from each enterprise location, and responsive to the identified patterns, predict capacity utilization for the enterprise locations that efficiently utilizes capacity during the prediction time period. In some embodiments the capacity forecasting module is configured to predict capacity utilization over each of a plurality of time slots.

Some embodiments include a self-organizing network element connected to receive the capacity utilization predictions, and configured to reorganize the channels among the BS/APs responsive to their predicted capacity utilization, to provide a network reconfiguration plan predicted to efficiently utilize capacity during the prediction time period, and a domain proxy configured to pre-emptively re-allocate channels for the at least one enterprise network, responsive to the network reconfiguration.

In some embodiments the channel forecasting module is configured to generate models that are used to make predictions, and includes a Training/Retraining Module including machine learning configured to receive feedback data regarding prediction accuracy from each enterprise network, and utilize the feedback data to modify the models and thereby provide greater prediction accuracy.

Each of the enterprise networks may be configured to operate as a Citizen's Broadband Radio Service (CBRS) system, and the BS/APs comprise CBRS Devices (CBSDs) that are located at the enterprise location and form part of the enterprise network.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIGS. 6A and 6B are charts showing an example data set of network channel utilization data over the network for a period of one day; in FIG. 6A, the data set is represented with a channel raster of 10 MHz wide, in FIG. 6B, the same data is represented with a channel raster of 20 MHz wide.

FIGS. 7A and 7B are charts showing a data set of network channel utilization data for multiple days illustrating an extended time series data set; in FIG. 7A, the data set is represented with a channel raster of 10 MHz wide, in FIG. 7B, the same data is represented with a channel raster of 20 MHz wide.

FIG. 14 is a data chart of one example of capacity usage data for channels within an enterprise over a period of time, representing the data in channel indexes in rows, and time intervals in columns.

The figures are not intended to be exhaustive nor to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) 4G and 5G Communication Networks and Systems

Communication networks and system components are described herein using terminology and components relating to CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network.

(2) Enterprises and Enterprise Networks

An implementation in the context of an enterprise network is described herein. Although described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(3) Communication Network

Figure 1:
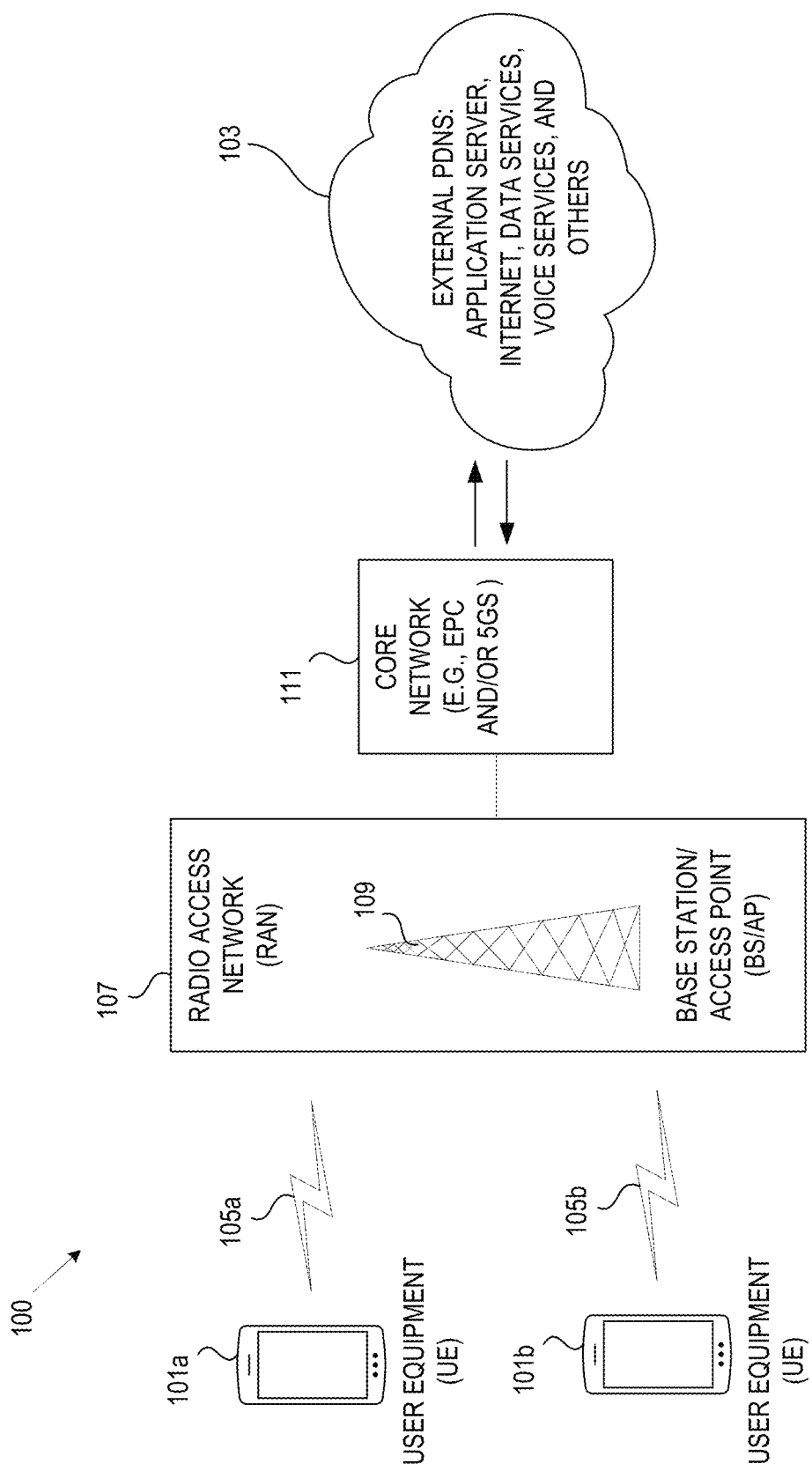
FIG. 1 is an illustration of a basic configuration for a communication network, such as a "4G LTE" (fourth generation Long-Term Evolution) or "5G NR" (fifth generation New Radio) network.
Figure 2:
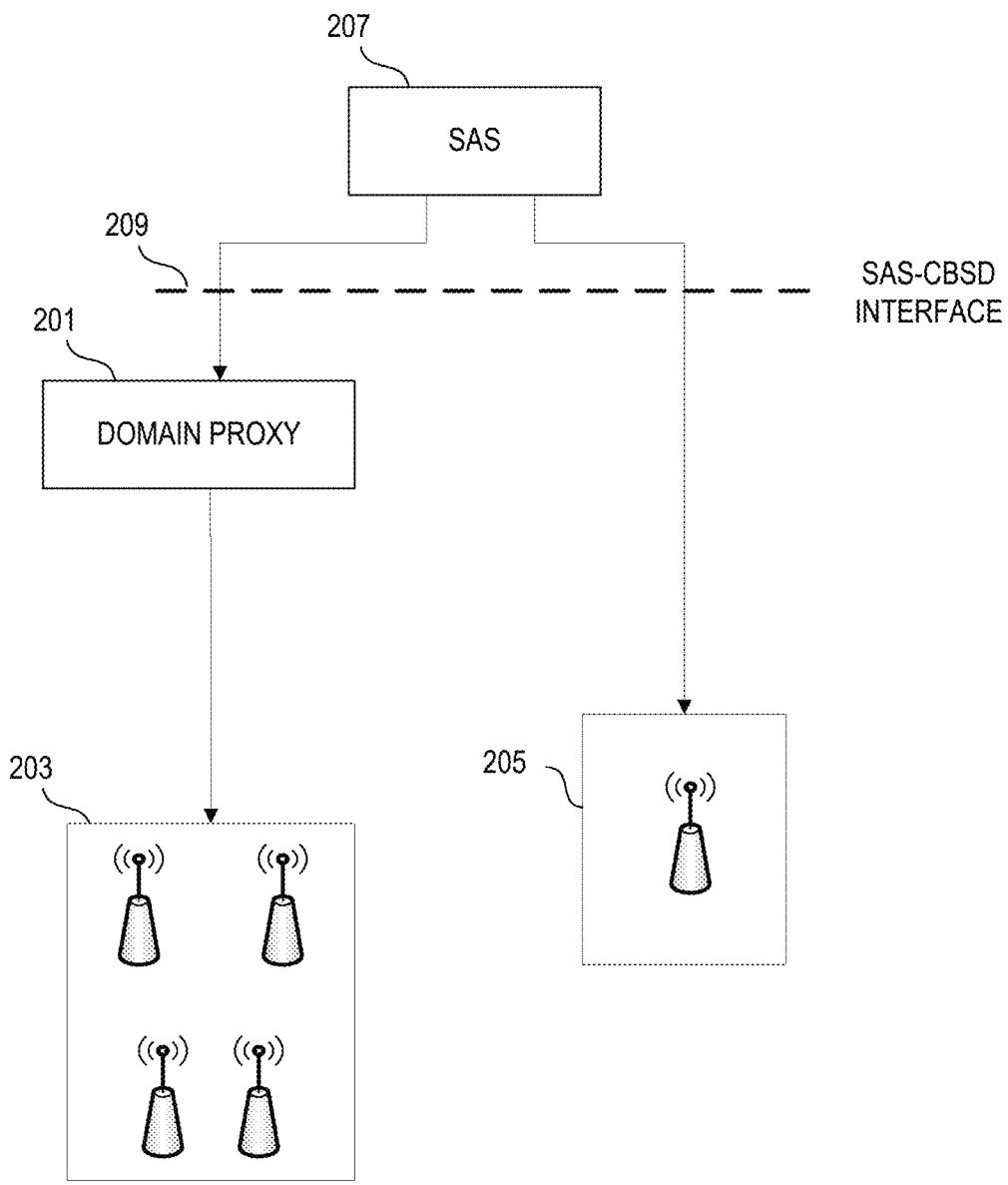
FIG. 2 is a block diagram of a communication network showing a Domain Proxy connected between a plurality of CBSDs and an SAS.
Figure 3:
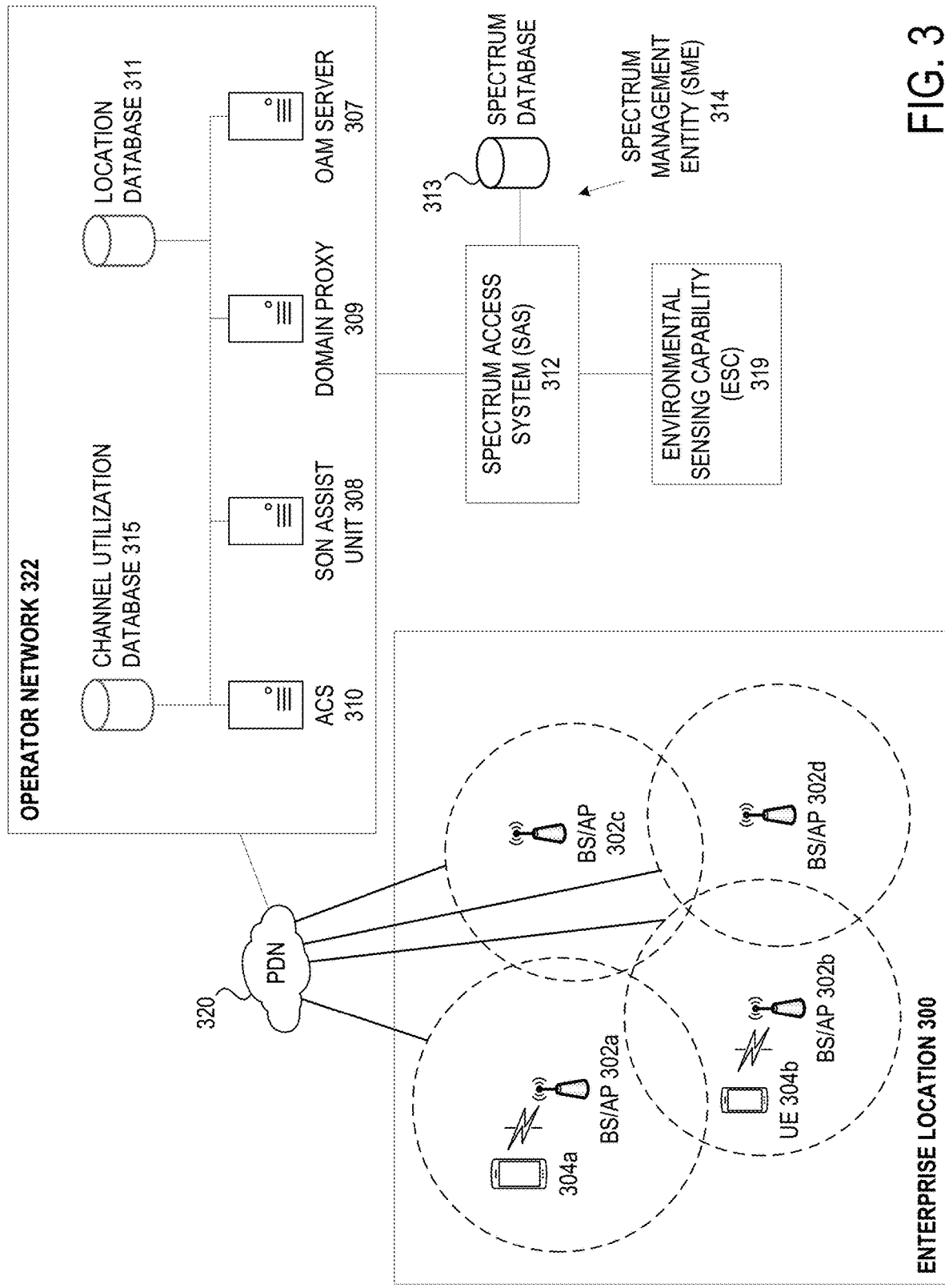
FIG. 3 is a diagram of a wireless communication network including an operator network connected to a Spectrum Management Entity (SME), an enterprise network including a plurality of BS/APs deployed within an enterprise location, and a plurality of UEs connected to the BS/APs.

FIG. 3 is a diagram of a wireless communication network in which the system described herein can be implemented. An enterprise network includes a plurality of BS/APs 302a, 302b, 302c, 302d (collectively BS/APs 302), deployed in an enterprise location 300. In FIG. 3, each BS/AP has a range represented by the circle, which approximately represents its wireless coverage. The BS/APs may be CBSDs in a CBRS system, which is a spectrum-controlled system in which the CBSDs must be registered before operation in order to avoid interference with other users such as incumbent users that have higher priority to use the CBRS band.

In FIG. 3, a first UE 304a is wirelessly connected to a first BS/AP 302a, which is providing service to it. A second UE 304b is wirelessly connected to a second BS/AP 302b, and is providing service to that second UE 304b. All the BS/APs 302 are connected to a PDN 320 by any appropriate communications means, such as wire, fiber optic, and wireless radio.

The PDN 320 provides a connection to an operator network 322 that includes an OAM Server 307, a SON assist unit 308, a Domain Proxy 309, an Automatic Configuration Server (ACS) 310 and a Location Database 311, all of which are connected to each other within the operator network 322 by any appropriate means.

In an enterprise network deployment, the BS/APs 302 will be located at an enterprise location, and it is very likely that the operator network 322 will be physically located at or near the enterprise location, especially in large or multiple deployments in the same area. However, for smaller deployments, or for multiple small deployments, it may be more cost effective to physically locate the operator network remotely from the enterprise location.

The operator network 322 is connected to a Spectrum Access System (SAS) 312, which is connected to a Spectrum Database 313 that includes data regarding the spectrum that it is managing. Collectively, the SAS 312 and the Spectrum Database 313 may be referred to as a Spectrum Management Entity (SME) 314.

In a typical network architecture, the enterprise BS/APs are not managed directly by a SAS but instead by the Domain Proxy 309. In this architecture, the Domain Proxy 309 registers all the enterprise BS/APs as a group with the SAS 312 and performs interference coordination. The set of available channels for use as indicated by the SAS are carefully assigned among the enterprise BS/APs such that there is negligible/nil interference, or as minimal interference as possible. To achieve this, the Domain Proxy may utilize any appropriate system such as self-organizing algorithms (in the SON unit 308).

The Domain Proxy 312 and the ACS 310 may also form an radio frequency (RF) terrain map of the enterprise using information such as data from Radio Environment Monitoring (REM) results (network listening methods) from each BS/AP, GPS information from on-board GPS from the BS/APs or a combination of both. Such location information (REM and GPS/cartesian coordinates) are maintained in Location database 311. Knowing the RF terrain, the Domain Proxy 312 and SON Unit 308 can determine and allocate an optimal channel for each BS/AP to keep the interference to a minimum.

The SAS 312 may be connected to an Environmental Sensing Capability (ESC) 319, which monitors the spectrum over a wide area and notifies the SAS 312 that an incumbent (such as a navy ship) or other interfering source may soon be near the enterprise location or another location being served by the SAS 312.

The configuration of channels on the BS/APs and fetching of REM results/GPS coordinates from the BS/APs are performed over an OAM interface, for example TR069 or SNMP provided by the OAM server 307. The OAM server 307 provides a variety of functions. According to the IETF definition of OAM (RFC 6291 definition) the components of the "OAM" acronym are defined as follows:

Operations—Operation activities are undertaken to keep the network (and the services that the network provides) up and running. It includes monitoring the network and finding problems. Ideally these problems should be found before users are affected.

Administration—Administration activities involve keeping track of resources in the network and how they are used. It includes all the bookkeeping that is necessary to track networking resources and the network under control.

Maintenance—Maintenance activities are focused on facilitating repairs and upgrades—for example, when equipment must be replaced, when a router needs a patch for an operating system image, or when a new switch is added to a network. Maintenance also involves corrective and preventive measures to make the managed network run more effectively, e.g., adjusting device configuration and parameters.

FIG. 3 is one example of a wireless communication network in which the system described herein can be implemented, other implementations are possible.

(4) CBSD and SAS Activities During Normal Network Operation

In a CBRS network, the spectrum is managed by an SAS, and accordingly the CBSDs within the CBRS network must follow directions from the SAS. Following are some of the current CBSD requirements (from WINNF-TS-0112, R0-DEV-04: CBSD technical operation Ref-2, 96.39). As mentioned earlier, the interface specification is under continuing development; subsequent versions are likely and, in such cases, the following requirements are either absorbed in full or encompassed within the newer requirements.

"a. All CBSDs must be capable of two-way operation on any authorized frequency assigned by an SAS. Equipment deployed by Grandfathered Wireless Broadband Licensees during their license term will be exempt from this requirement.

b. A CBSD must operate at or below the maximum power level authorized by an SAS, consistent with its FCC equipment authorization, and within geographic areas permitted by an SAS on the channels or frequencies authorized by an SAS.

c. A CBSD must receive and comply with any incoming commands from its associated SAS about any changes to power limits and frequency assignments. A CBSD must cease transmission, move to another frequency range, or change its power level within 60 seconds as instructed by an SAS.

d. A CBSD must report to an SAS regarding received signal strength in its occupied frequencies and adjacent frequencies, received packet error rates or other common standard metrics of interference for itself and associated End User Devices as directed by an SAS [Note: See R2-SGN-01]."

During normal network operation, the CBSDs in a CBRS system are broadcasting and receiving on channels assigned by the SAS. In a typical configuration in which a Domain Proxy is implemented, the Domain Proxy handles all messaging and communications between the CBSDs and the SAS. During normal operation, the SAS and Domain Proxy exchange heartbeat messages so that the SAS can remain informed regarding the channels that are in use within the network. The messaging is performed in accordance with standards, such as those set by the Wireless Innovation Forum (CBRS WInnForumStandards, Document-T-0016, Version 1.2.4, 26 Jun. 2019).

Figure 4:
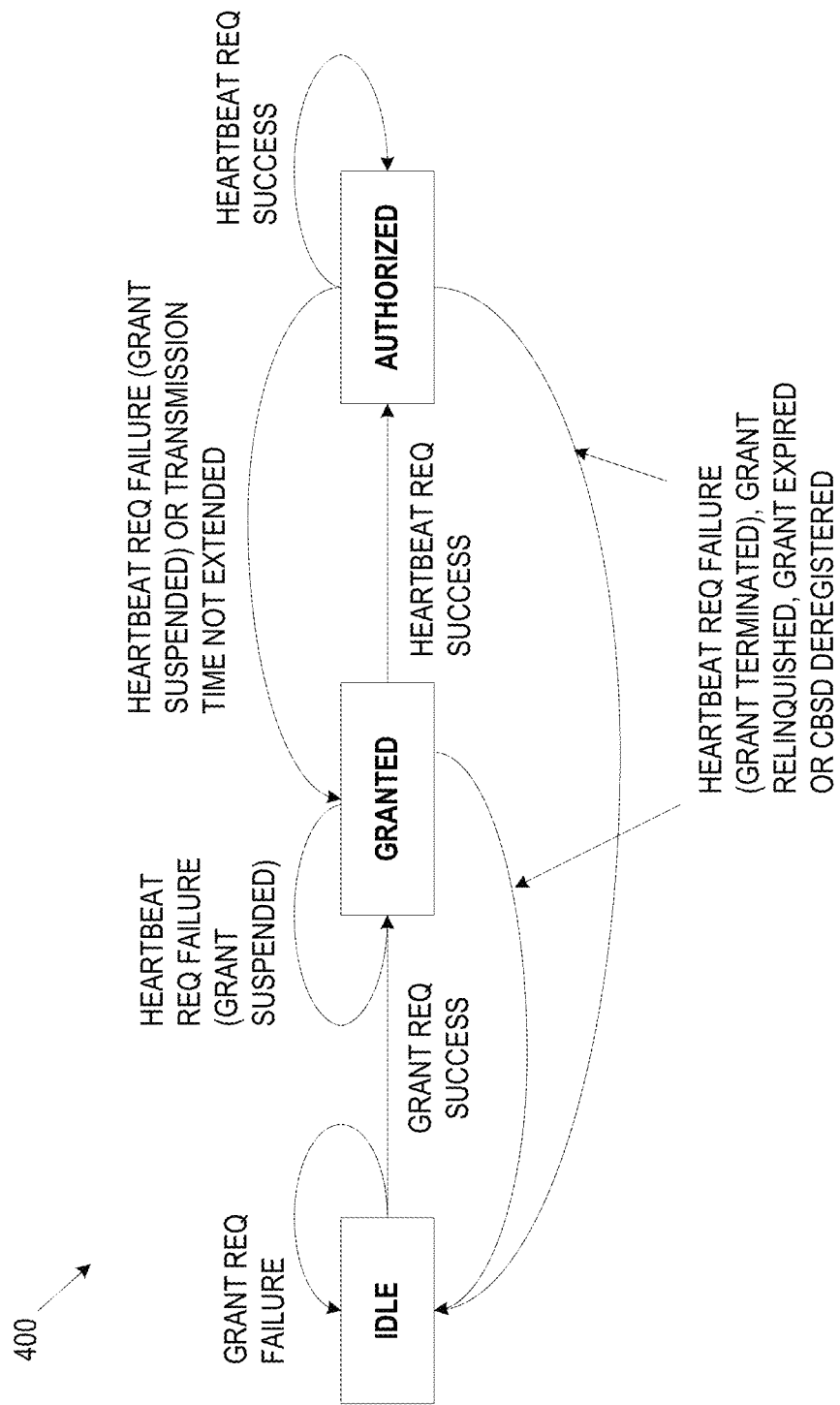
FIG. 4 is a grant state diagram of a CBSD in a CBRS system, showing states and transitions between the Idle state, Granted state, and Authorized states.

FIG. 4 is a grant state diagram 1000 of a CBSD in a CBRS system, showing states and transitions between the Idle state, Granted state, and Authorized state. FIG. 4 is a reproduction of "FIG. 3: Grant State Diagram, CBRS WInnForumStandards, Document-T-0016, Version 1.2.4, 26 Jun. 2019". Following is quoted text from that standard related to Grant State Diagram, which describes these states. Additional details, such as messaging standards, are set forth in that standard document.

"FIG. 3 (FIG. 4 herein) shows the state transitions of a CBSD Grant. A CBSD in the Registered state can request one or multiple Grants from the SAS. A Grant state machine is in the Idle state if a Grant has not been approved by the SAS. A CBSD can send the SAS a GrantRequest object. If a Grant request is approved, a new Grant is created with operational parameters and a channel allocation. The reception of a successful GrantResponse object causes transition to the Granted state. A CBSD with a Grant that is ready to commence RF transmission commences heartbeat requests associated with the Grant. If a CBSD receives multiple Grants, individual heartbeat requests are sent for each Grant, possibly aggregated in a single transmission to the SAS. If the SAS approves a heartbeat request, the Grant transitions to the Authorized state. In the Authorized state, the CBSD is permitted to commence RF transmission and operate in the CBRS band using the operational parameters specific to that Grant. The Grant transitions from the Authorized state back to the Granted state if the Grant is suspended by the SAS or the transmission right, as defined by the transmitExpireTime parameter in the HeartbeatResponse object, has expired. The Grant state transitions to Idle if a Grant is terminated by the SAS, relinquished by the CBSD, or expired as defined in the grantExpireTime parameter, or the SAS to CBSD connectivity is lost (see Section 8.6)."

As discussed, the Domain Proxy typically handles messaging and communication between the CBSDs and the SAS. The Domain Proxy may be connected to a SON unit, which helps manage network operations, and an ACS unit 310, which manages operations of the CBSDs.

(5) Suspension/Termination (ST), Terminating Transmissions on Channel.

As can be seen from the state diagram of FIG. 4, the grant of spectrum can be suspended and/or terminated by the SAS for a number of reasons; the end result of which is that there will be a suspension/termination order that requires transmission to cease on one or more of the channels that the SAS previously authorized. In other words, the now-prohibited channel must be shut down. When a suspension/termination (ST) order is given, the impacted CBSD is given a short amount of time (60 seconds under the current rules) to shut down any further transmissions on that channel.

In the CBRS system the termination order may be called a "suspension" order or a "termination" order; regardless the result is that communications on the channel must be terminated within a time period. Therefore, the term "termination" may be used broadly, and includes what is technically called a suspension or termination order in a CBRS system. Also, in the CBRS system, the external entity controlling the spectrum may be called the SAS or SME, in other contexts, the entity controlling the spectrum may have a different name and may be external or internal to the enterprise wireless network.

During normal operation, it is expected that one or more UEs will be wirelessly connected to each CBSD. Suppose an enterprise as exemplified earlier has commenced operation with up to N CBSDs as shown for example in FIG. 3. To communicate with its respective CBSD, each UE will be transmitting and receiving on the same channel as the CBSD with which it is associated. One consequence of an ST order is that the UEs connected to the impacted CBSDs will in turn be impacted, because the CBSDs and their connected UEs are communicating on the same channel that is being suspended/terminated. As stated above, all communications over the prohibited channel must be shut down in a short time (60 seconds in a CBRS system), and in order to provide a smooth transition for the UEs to another channel and avoid any disruption in communications, a method of handling an ST order is needed.

Specifically speaking, the SAS in the CBRS system sends a suspension order for one or more grants rather than the channel itself. For simplicity, we may indicate that a channel is suspended or terminated, meaning one or more grants are suspended or terminated, and those grants map to that channel. Per current CBRS regulations, once a suspend/terminate order is issued for a channel (more specifically, a grant ID), the CBSDs must cease transmission on that channel within 60 seconds.

As discussed above, once channels are authorized (granted) and the system is operating, the spectrum controlling entity (the SAS in the CBRS system) may need to suspend or terminate operations on one or more channels in order to accommodate higher priority users, for example incumbent users, and in such a circumstance, any BS/APs 302 transmitting on the prohibited channel must stop transmitting within a specified time period after a termination order is received. However, UEs may be connected to the impacted BS/AP(s), and in order to maintain connectivity and avoid adversely affecting communication with these UEs that are connected to the impacted BS/AP(s), communication must be transferred to another (non-impacted) BS/AP before transmissions on that channel cease on the impacted BS/AP.

The inventors have recognized that if the operator network (322) has some awareness of which channels are more likely to be suspended or terminated within one or more time periods, then the system can plan ahead and choose to avoid operating on those channels during those time periods. More specifically, if the system has awareness that one or more specific channels are probabilistically more likely to be suspended or terminated between certain time periods, the system can choose to reconfigure a priori by running the self-organizing (SON) algorithms continually and evaluate several complex scenarios without time pressures. This can be advantageous because the SON algorithms may require some time to reach an optimal solution.

(6) Predicting Suspension/Termination

Figure 5:
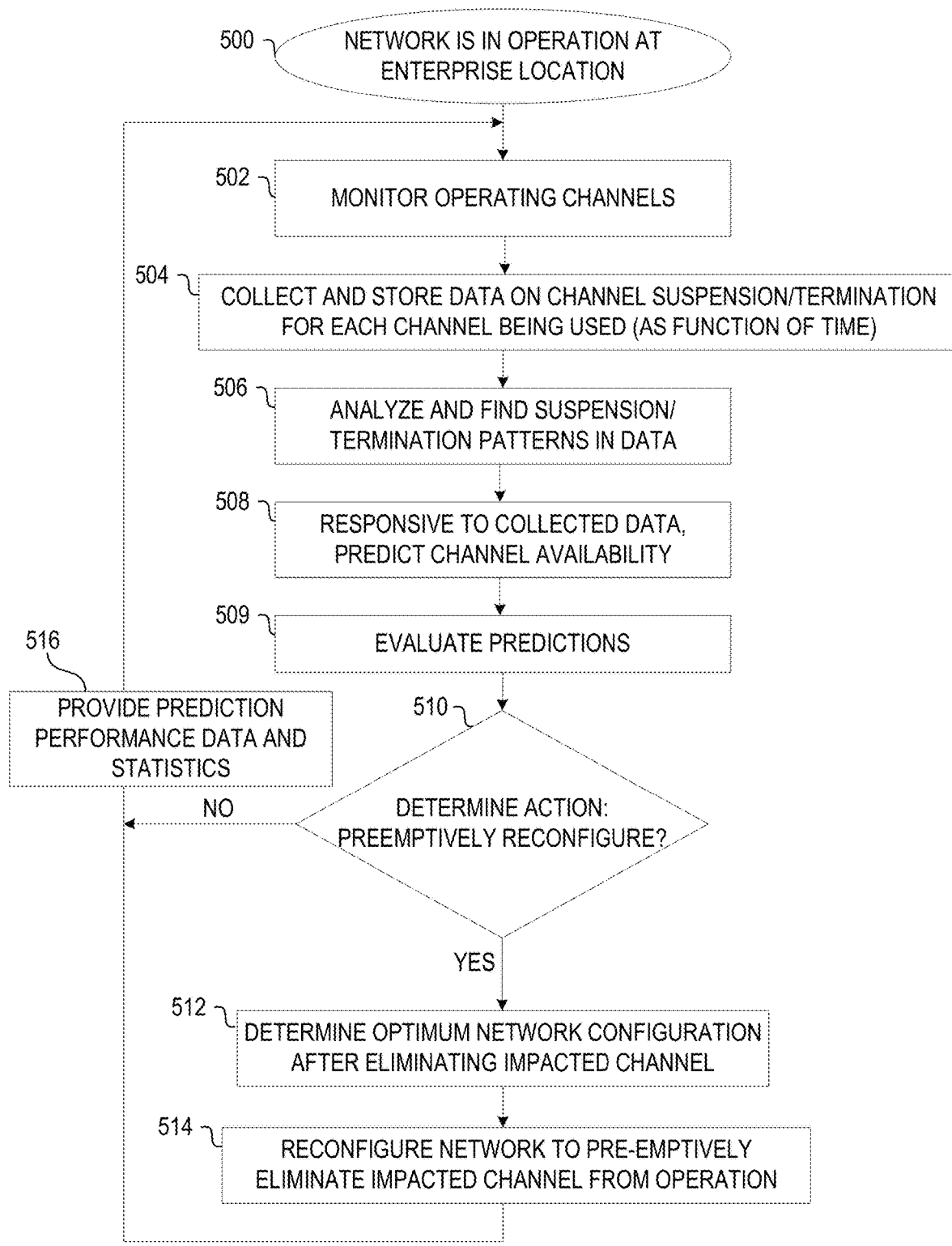
FIG. 5 is a flow chart showing operations in an enterprise network to monitor channel disruptions over a period of time, predict channel suspensions/terminations that may occur in the future, and then preemptively reconfigure the network to avoid potential disruption(s) in service.

FIG. 5 is a flowchart of operations to monitor channel disruptions over a period of time, predict channel suspension/terminations that may occur in the future, and then preemptively reconfigure the network to avoid potential disruption(s) in service.

At the start (STEP 500), network operations at an enterprise location are assumed to have begun: the BS/APs 302 (FIG. 3) are communicating with the UEs 304 and the Domain Proxy 309, and the Domain Proxy is communicating with a spectrum access system 312 such as an SAS in a CBRS system, which allocates spectrum to the Domain Proxy and has authority to issue suspension/termination orders.

In the next step (STEP 502) the Operator Network 322 and each of the BS/APs 302 monitors operations on each channel operating in the network. In one implementation, each of the BS/APs 302 monitor channel operations, and the BS/APs periodically report back to the Domain Proxy. Particularly, in order to provide data to make predictions regarding channel availability and suspension/termination, the enterprise's operator network 322 monitors the channels being used and utilizes data collection techniques to keep track, over time, of relevant information such as each channel's spectrum availability, the spectrum utilized (requested/granted), and the channels that are suspended/terminated, at an appropriate granular time scale.

Figure 8:
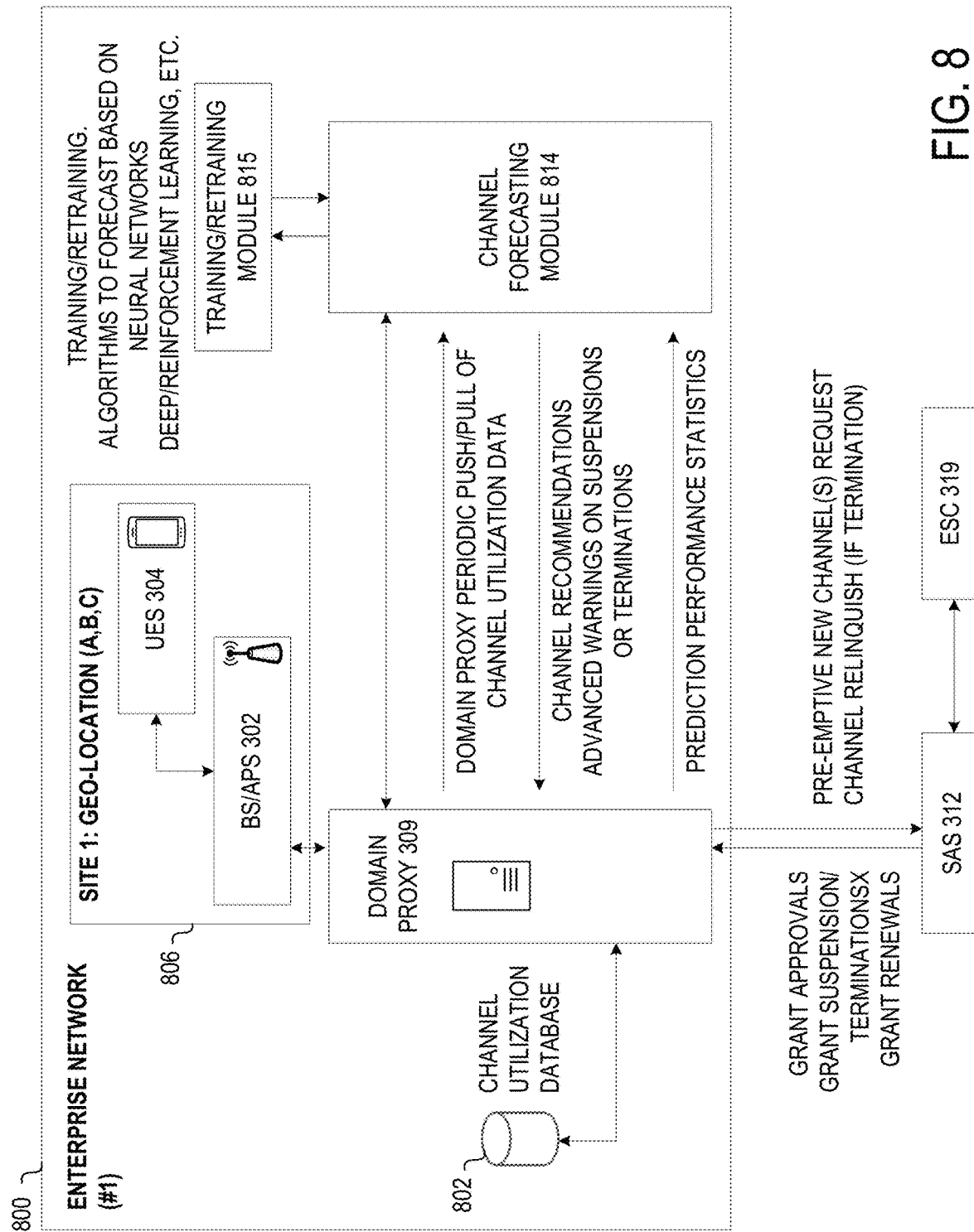
FIG. 8 is a block diagram of elements within one example of an Enterprise Network, including those utilized to store channel utilization information and assist with performing channel forecasting.

In the next step (STEP 504) the data from each of the BS/APs is collected and stored in an appropriate form, such as in digital form in a database such as the Channel Utilization Database 802 shown in FIG. 8.

(7) Data Collection and Storage (STEP 504)

Figures 6A, 6B:
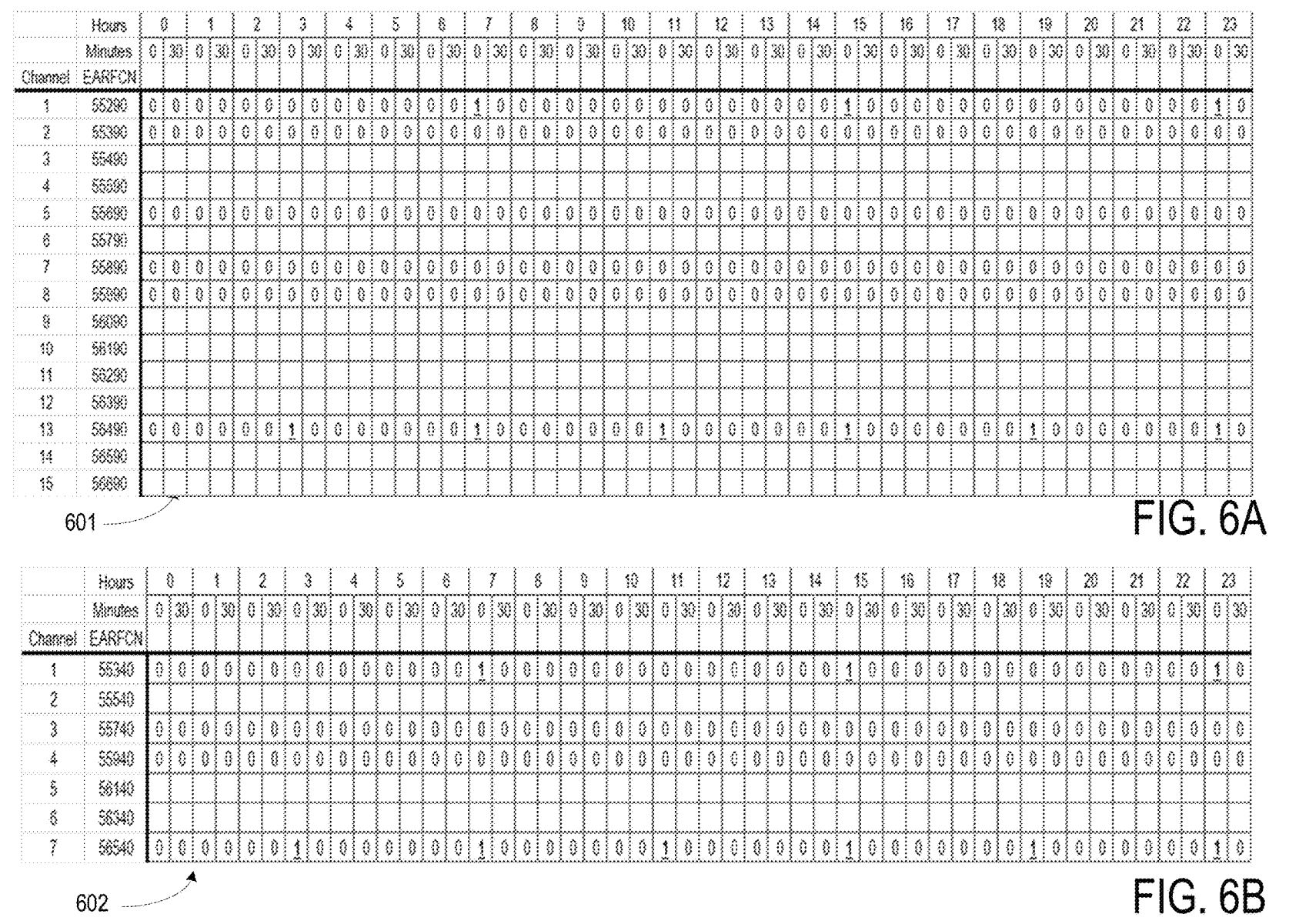

FIGS. 6A and 6B are charts showing an example data set of channel utilization data over the network for a period of one day (24 hours, labeled across the top 0 to 23 hours). This data set is shown in two forms: in FIG. 6A, the data set 601 has a channel raster 10 MHz wide, in FIG. 6B, the same data is shown as a dataset 602 with a channel raster of 20 MHz wide. For data collection purposes, as shown in the ten MHz dataset 601 of FIG. 6A, the 150 MHz CBRS band can be split into fifteen contiguous and equal chunks of 10 MHz. Alternatively, as shown in FIG. 6B, the 150 MHz CBRS band can be split into seven contiguous and equal chunks of 20 MHz (the bottom 10 MHz may be left open i.e., unused for charting, if the 20 MHz raster is chosen). The channel numbers are respectively shown along the vertical axis center, in addition the frequencies mapping to the corresponding 10 MHz and 20 MHz channel numbers are shown in 3GPP format; specifically, the EUTRA absolute radio frequency channel numbers (EARFCN) are shown in FIGS. 6A and 6B corresponding respectively to the channels with which they are associated.

In FIGS. 6A and 6B, the top row refers to the "hour" after the enterprise began operation (or any other appropriate reference time) and the second row (in minutes) refers to the 1st and 2nd half of each hour since the enterprise has begun operation. The data is a discrete time series partitioned into an arbitrary set of evenly split time units, which in this example is 30 minutes. The value at each point in the time series is a binary value indicating the status of a channel. Data is collected for different channels orthogonally.

A value of zero (=0) in any row in FIGS. 6A and 6B means that the EARFCN was used by at least one BS/AP in the enterprise, and that EARFCN was neither suspended nor terminated during that time period. Similarly, a value of one (=1) in any row in FIGS. 6A and 6B means that the EARFCN was used by at least one BS/AP in the enterprise and that EARFCN was suspended or terminated at least once within that half hour of the corresponding hour. A blank cell in any row in FIGS. 6A and 6B means that the "EARFCN was not used by any of the BA/APs in the enterprise within that half hour of a corresponding hour.

For data collection purposes in this example it is only important to determine if a specific channel was suspended at a given time and not if a specific BS/AP was suspended at a given time. In the data set example shown in FIG. 6A, EARFCN=55290 has been used within the enterprise by at least one BS/AP each time slot throughout the 24 hour period since the enterprise begun operation, and EARFCN=55290 has received suspension or termination from the SAS during the 1st half hour slot of the 7th, 15th and 23 rd hours respectively since the enterprise began operation. As an additional example, EARFCN=55490 was never used by any BS/AP of the enterprise during any time slot within the 24-hour period immediately after enterprise began operation.

The data arrangement in FIGS. 6A and 6B is one way of representing data; many other ways of representing the data can be utilized. For instance, the channel utilization information can be maintained at a different granularity (i.e., a different period), for example every 5 or 10 minutes instead of every 30 minutes. Also, in this example the channel raster is shown to be 10 MHz or 20 MHz, but channel raster data collection can also be maintained at a much higher granularity, e.g., 5 MHz wide, in addition to other granularities, wider or narrower. The same general principle applies when the channel utilization information is maintained as a time series of data in which the status of a channel (at one or more granularities) within any time period in the past can be determined.

Another point to note is that when maintaining channel utilization data as illustrated in FIGS. 6A and 6B, information must be populated consistently, and cross-referenced correctly. For example, if the enterprise operated only 10 MHz channels for its CBSDs, a suspension or termination of EARFCN=55290 (this channel number unambiguously refers to a 10 MHz channel), would also have resulted in the corresponding 20 MHz channel (EARFCN=55340) to be suspended or terminated had the enterprise chosen to operate 20 MHz channels. Note that EARFCN=55340 (20 MHz channel) has corresponding counterpart 10 MHz EARFCNs=55290 and 55390. If at least one of EARFCNs 55290 and/or 55390 is suspended or terminated, EARFCN=55340 will be marked with value (=1). Accordingly, in FIG. 6, we note EARFCN=55340 marked with a value (=1) since EARFCN=55290 had been suspended or terminated. An additional example can be seen whereby, when EARFCN=56490 (10 MHz channel) is suspended or terminated, EARFCN=56540 (20 MHz channel) is correspondingly marked as impacted. The converse of this is also true. For example, if the enterprise operated 20 MHz channels, a suspension or termination of a 20 MHz channel (e.g. EARCN=56540) will result in suspension or termination of both corresponding 10 MHz channels (EARFCNs=56490 and 56590).

In one implementation, a database is utilized to store the time-series data, which includes channel utilization information.

Figures 7A, 7B:
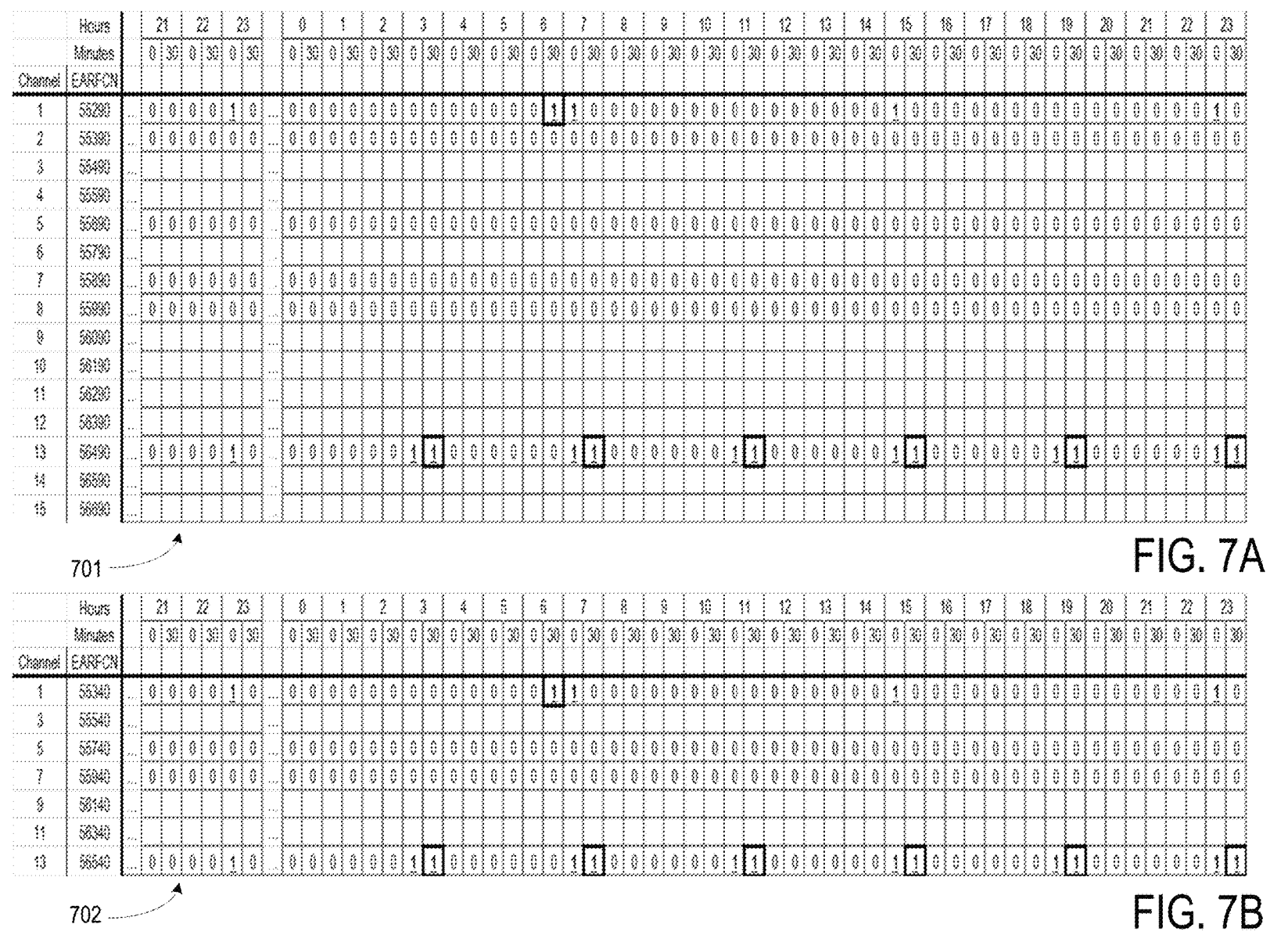

FIGS. 7A and 7B are charts showing a data set of network channel utilization data for multiple days illustrating an extended time series data set as a continuation of what is illustrated in FIGS. 6A and 6B. As in FIGS. 6A and 6B, the data set in FIGS. 7A and 7B is labeled across the top in daily increments of 0 to 23 hours, and this data set is shown in two forms: in FIG. 7A, the first data set 701 is shown with a channel raster of 10 MHz wide, in FIG. 7B, the same data is shown as a second data set 702 with a channel raster of 20 MHz wide. For descriptive purposes, FIGS. 7A and 7B can be considered to contain time series data for the Kth day after the enterprise commenced operation.

As will be described, data may be collected over a long period of time: days, weeks, month, or years, which can be useful for the subsequent data analysis and locating patterns in the data, especially if the patterns are intermittent or have longer periods.

Over a long stretch of time, there may be periods when the enterprise is not operating on one or more channels; for example there may be periods of time during which the network (or parts of it) are not operating due to being reserved for a software upgrade, and/or the network may be "reserved for operator use" for a (usually short) period of time. Under such circumstances, the channels are "neither suspended, terminated, nor utilized", and therefore the "0" or "1" indicator would not adequately capture this circumstance. To capture the "neither suspended, terminated, nor utilized" situation, a flag or other indicator (such as a "2") in the appropriate time slot(s) can be provided in the channel utilization data to indicate that there is no data available during that time slot. This indication will help the Artificial Intelligence (AI) and machine learning (ML) algorithms to disambiguate and create a model appropriately.

In summary, under some scenarios, we will have time series data for K consecutive days but for J days (or portions of days) within those K days, the enterprise may be "non-operational" for some valid reasons (e.g., SW upgrade and network "reserved for operator use"), and in such cases, there are no grants, no suspensions, no terminations. In that situation, data in the time series is indicated unavailable by a flag other than 0 or 1 so that the AI/ML tools can disambiguate and model the time series data appropriately.

(8) Enterprise Block Diagram (FIG. 8)

FIG. 8 is a block diagram of elements in the Enterprise Network 800, including those utilized to store channel utilization information and assist with channel forecasting. In FIG. 8, the SAS 312 (FIG. 3) is connected to communicate with the Domain Proxy 309. As described elsewhere, the SAS 312 provides information and messages such as grant approvals, grant suspension/termination orders, grant renewals, and heartbeat requests to the Domain Proxy 309. The messages from the Domain Proxy 309 to the SAS 312 include pre-emptive new channel request(s), and channel relinquish (subsequent to termination), among others.

The Domain Proxy 309 is also connected to one or more BS/APs 302, which monitor channel utilization, and then (STEP 504) transmit the channel utilization data to the Domain Proxy 309. The Domain Proxy 309 then stores the data in a Channel Utilization Database 802.

For channel forecasting, the Enterprise Network 800 includes a Channel Forecasting Module 814 connected to the Domain Proxy 309. To provide the data for channel forecasting, the Domain Proxy 309 pushes the channel utilization data from the Channel Utilization Database 802 to the Channel Forecasting Module 814, typically on a periodic basis. The Channel Forecasting Module 814 includes Artificial Intelligence (AI) configured to analyze the channel utilization data and make predictions about possible channel suspensions/terminations. The Channel Forecasting Module 814 communicates with the Domain Proxy 309 and can transmit channel recommendations and advanced warnings on potential suspensions or terminations to the Domain Proxy 309. The Domain Proxy 309 provides feedback in the form of prediction performance statistics to the Channel Forecasting Module 814. The Channel Forecasting Module 814 can maintain the time series data over a time span that may be days, weeks, months or even years.

The Channel Forecasting Module 814 is connected to a Training/Retraining Module 815, which may employ one or more concurrent machine learning paradigms to assist with model generation and AI in the Channel Forecasting Module 814. The Channel Forecasting Module 814 and the Training/Retraining Module 815 may collectively be referred to as an AI/ML Unit.

The BS/APs 302 and the UEs 304 are located in an enterprise location 800, at a site 1 for example, that has geo-location coordinates (a,b,c) in the following format: (latitude, longitude, altitude), or any other appropriate format. The UEs 304 are located within or near the enterprise location 806, within range of the BS/APs 302, and communicate with the BS/APs 302 that provide communication services for the UEs 304. Typically, the Domain Proxy 309 and the Channel Utilization Database 802 are physically located at or near the enterprise location 806, however in some embodiments they may be remote from the enterprise location 806. Typically, the Channel Forecasting Module 814 and the Training/Retraining Module 815 will be located remotely from the enterprise location 806, however in some embodiments they may be located at or near the enterprise location 806. Herein the enterprise location and the network elements (on location or remote) may be referred to as an enterprise network.

Referring back to FIG. 5 briefly, the next step (STEP 506) is to analyze the collected channel utilization data in the Channel Forecasting Module 814 to find suspension/termination patterns in the data, which will be described in more detail below. Then in the following step (STEP 508), described in more detail below, the patterns are used in the Channel Forecasting Module 814 to predict suspension/termination events in the future; i.e., channel availability will be predicted responsive to the collected and analyzed data and the patterns located in the data, as will be described in more detail below.

In the event that the Channel Forecasting Module 814 predicts and sends an advance warning of a potential suspension/termination, the Domain Proxy 309, together with help from other units such as the SON unit 308, evaluates the predictions (STEP 509) and decides what action to take (STEP 510). The actions to be taken depend upon a number of factors, such as the probability of suspension, the length of the suspension, and how soon the suspension will occur. Potential suspension of one channel need not always trigger the Domain Proxy to make an alternative channel assignment request with the SAS 312. For example, if the alternative channel also has a high probability of suspension within a short period of time, then a pre-emptive reselection of the alternative channel in lieu of the current channel (though likely to be suspended) may not be not worthwhile.

If it is determined (STEP 510) to pre-emptively reconfigure the network, then the optimum network configuration is determined (STEP 512) by e.g. the SON Assist unit 308, and then (STEP 514), the network is reconfigured accordingly to eliminate the potentially impacted channel from operation. The network then observes whether or not the channel is actually terminated and provides feedback to the Channel Forecasting Module 814 and/or Training/Retraining Module 815. If it is determined not to reconfigure the network (STEP 510), then the network observes whether or not the channel is actually terminated, and provides feedback (STEP 516) to the Channel Forecasting Module 814 and/or Training/Retraining Module 815 Operation then returns to monitoring the operating channels (STEP 502), and continues as before.

(9) Analyze Collected Data and Locate Patterns (STEP 506)

Referring back to FIG. 5, to analyze and find suspension/termination patterns in the data (STEP 506), the data may be processed as will be described. In general, the channel utilization information is algorithmically manipulated in the Channel Forecasting Module 814 to determine suspension/termination patterns that may exist in the time series. It can be advantageous to collect and analyze time series data over extended periods of time; in other words, by storing and analyzing data over a longer time series (for example, covering several weeks or months of observance instead of days), we may be able to infer patterns that would not be identifiable with a shorter time series of data.

For illustrative purposes in a simple example, by visually examining FIGS. 6A and 6B, and assuming the same pattern persists day after day, we can determine that EARFCN=55290 is probabilistically very likely to be suspended or terminated every eight hours during the 1st half hour slot. The data shown in FIGS. 6A, 6B, 7A and 7B is simplified for illustrative purposes and ease of explanation; however in real situations the patterns will be much more complex and complicated, and a very large amount of data will need to be analyzed, and therefore machine learning paradigms are useful and necessary to analyze the data and find patterns.

In example data shown in FIGS. 7A and 7B, we illustrate aberrations in a pattern, as well as a more periodic change in a pattern. Specifically, looking at FIG. 7A, we note that EARFCN=55290 has witnessed a suspension or termination on the Kth day during the 2nd half of the 7th hour after midnight. This is illustrated with a value (=1) in dark shade in row 1. Prior to the Kth day, EARFCN=55290 received suspension or termination every 8 hours starting with the 8th hour after midnight during the 1st half hour slot. Thus, by manual inspection, we can deem this to be an aberration to an estimated pattern. However, by examining data on a longer scale (several months of data, for example), we may be able to discover that this is not really an aberration, but a pattern that repeats every K days. Thus, a pattern that is decipherable on a slower cadence may simply appear as an aberration at a higher cadence.

Also, in FIG. 7A, we note that the 10 MHz raster pattern for EARFCN=56490 has persistently changed from the pattern in FIG. 6, in that the channel has witnessed a suspension or termination during both halves of the hour, every 4 hours, starting from the 4th hour after midnight. The delta-change in pattern is highlighted with value (=1) in a darker shade. In FIG. 7B, the corresponding 20 MHz pattern, EARFCN=56540, is also shown as exhibiting an identical pattern.

As mentioned above, the data shown in FIGS. 6A, 6B, 7A and 7B is simplified for illustrative purposes, and in real situations, the patterns will be much more complex and complicated, and a very large amount of data will need to be analyzed, and therefore machine learning paradigms will be necessary to determine the existence of a pattern (or a lack of a pattern). Using statistical analysis and machine learning as described herein, the Channel Forecasting Module 814 finds patterns and then can estimate or predict the likelihood of a channel blockage at specific times in the future.

(10) Data Storage, Compression by T&R Module

As discussed above, to aid channel forecasting, Domain Proxy 309 periodically pushes the channel utilization information to the Channel Forecasting Module 814, which maintains the time series data over a time span that may be days, weeks, months or even years. However, the granularity of information transmitted from Domain Proxy 309 to Channel forecasting module 814 may impose such a huge storage requirement on the Training/Retraining Module 815 that it may be necessary or useful to decimate (or) compress the data that are historically irrelevant or less relevant. For example, a high-performance channel forecaster module 814 may utilize a model that has trained on several years of data. However, if we are able to determine by analyzing prediction performance statistics that the prediction performance will be impacted by less than 0.1% (as an example) if training data older than one year were culled from the storage database, then training data older than one year may be compressed, culled or decimated. As an example, we can delete the storage older than one year or compress the data older than one year for safe-keeping or apply a decimation filter to utilize only a fraction of the training data older than one year. The Channel Forecasting Module 814 and the Training/Retraining Module 815 may work cooperatively to perform data normalization, data culling or any procedure to regularize the data.

(11) Model Generation and Predicting Channel Availability (STEP 508)

Referring back to FIG. 5 briefly, the analyzed data and suspension/termination patterns (from STEP 506) are provided to the following step (STEP 508) in which the patterns are used in the Channel Forecasting Module 814 to predict suspension/termination events in the future; i.e., channel availability will be predicted responsive to the collected and analyzed data and the patterns located in the data, as will be described in more detail below.

The Training/Retraining Module 815 may employ one or more concurrent machine learning paradigms to assist with model generation. Any of a number of appropriate machine learning systems can be implemented. Several algorithms may be deployed simultaneously for improving the accuracy of channel forecasting. Depending on the volume of time series data present in the central repository, certain types of algorithms are better suited for predictive forecasting. For example, if the time series data is sparse, it may be useful to model the difference between two periods of suspension instead of modeling to predict the exact time that a suspension will occur.

Certain algorithms exhibit limitations when the data set used for training is insufficient; for example, if employing neural network-based solutions such as Long Short Term Memory networks (LSTM), sparse matrices do not usually provide sufficient performance. In certain simplistic scenarios, if we are able to accurately measure the length between two periods of channel suspensions or terminations, we may be able to fit such data to a distribution and determine (if) such a distribution follows a Poisson process, for example. In fitting data into a distribution, we may need to ensure that the data comes from independent and identically distributed (IID) random processes. Standard time series forecasting requires retraining for each forecast as there is an inherent assumption that the data does not come from independently and identically distributed random variables. In such standard cases, the training is longer and repetitive.

Alternative machine learning methodologies may also be applicable: For time series forecasting, Random forests, or Auto-Regressive Integrated Moving Average (ARIMA) models are typically useful. ARIMA typically filters out high incidence noise present in the data to detect localized trends based on linear dependence in observations within the series. ARIMA is popular since, similar to ordinary least-square regressions (LS regression), the relationship between the independent variables and the dependent variables are easily understood. In addition to this, in ARIMA, model selection can be performed over a time series in an automated fashion to maximize prediction accuracy. The data set may also exhibit high degrees of linearity. In such cases, simple linear regression models may be sufficient for high-performance prediction. Alternatively, polynomial regression may be applied to the data if the data is not reasonably linear. Certain paradigms such as Deep reinforcement learning sets the difference between a correct prediction and a wrong prediction as a reward or a punishment. In this paradigm, determining a good metric to measure difference between a correct and a false prediction is extremely important. If we assume that the data is not sparse or mildly sparse then we can employ LSTM. As mentioned earlier, LSTM is a feedback neural network. LSTM and other neural networks can digest highly complex data and find some existing patterns. Hence, LSTM (and other Deep learning neural networks) provide one of the most applicable paradigms to implement in the Training/Retraining module 315 in addition to other simultaneously running algorithms.

(12) Algorithm Retraining

The model used in the Channel Forecasting Module 814 should be retrained frequently (preferably perpetually) by the Training and Retraining Module 815 due to the intrinsic nature of time series data. Time series data is not expected to reveal static trends over time; essentially, time series data does not adhere to a notion of long-term rigidity. Thus, historic data is always relevant and one-time training is not satisfactory and essentially a false premise. Depending on the performance of prediction, historic data may be decimated or weighted less but historic data is almost always required.

The performance and effectiveness of a prediction algorithm can be measured in a number of ways, which can vary between embodiments. For example, effectiveness can be measured in terms of channel holding time (i.e. how long the channel continuously operates without suspension/termination) following a grant application. In order to provide better prediction performance in one embodiment, the Domain Proxy 309 provides feedback (STEP 516) to the Channel Forecasting Module 814 in the form of statistics relating to prediction accuracy, the channel holding time and any other useful information, so that it may use such statistics with the Training/Retraining Module 815 as a feedback loop for future training/retraining.

The Domain Proxy 312 generally performs a channel relinquish for the terminated channel with the SAS 312 only after a termination order arrives from the SAS 312. In other words, the Domain Proxy 309 does not preemptively relinquish a channel but only preemptively requests "grant" for a new channel. Unless and until a termination or a suspension order arrives from SAS 312, it is not possible to validate the effectiveness of the prediction made by the Channel Forecasting Module 314, and therefore the grant should be maintained until terminated by the SAS.

(13) Wide Area (Global) Forecasting Module: Multi-Enterprise/Multi-Location Deployment and Information Processing The inventors have recognized that a suspension or a termination may impact a channel in one geography, but the same channel may never witness a suspension or termination in another geography especially if the second area is far removed from the other. This principle can be expanded to provide better channel availability predictions based upon geographical location; one area may have different patterns of channel availability than another and knowing the patterns for each area can help with making better predictions. Thus, a network that is self-aware of its location in relation to other networks can better learn patterns of suspensions and terminations and dynamically reconfigure itself without waiting for the event to occur and therefore can maximize its performance and availability.

Multiple networks may exist in the same general geographic area. With knowledge of geography, channels that are in use within each geography, suspension and termination status at fine granularities can help a centralized algorithmic function to recommend alternative channels and/or warn about impending suspensions/terminations of currently used channels.

The term "global" is used herein for convenience, generally it should be understood to refer to a wide area, such as an area in which enterprise locations are in multiple, separate geographical locations. It is not intended to require coverage of the entire world, although many areas could eventually be covered.

Figure 9:
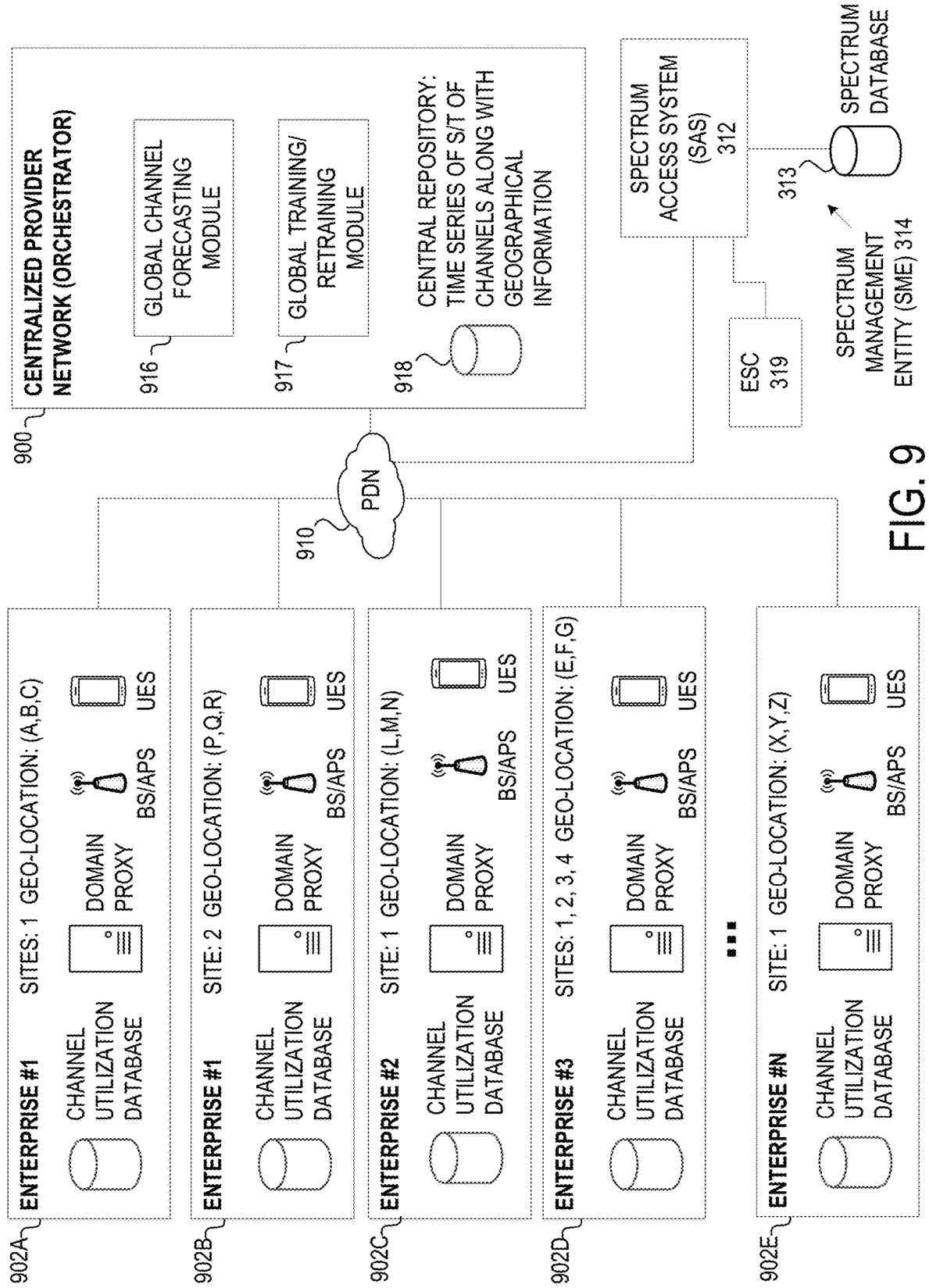
FIG. 9 is a block diagram of several enterprise sites and a centralized provider network that manages and provides services for the enterprise sites.

FIG. 9 is a block diagram that illustrates an example deployment of several enterprise sites (each with possibly different operators) referenced as 902*a*, 902*b*, 902*c*, 902*d*, 902*e* (collectively 902) whose services are managed by a centralized provider network 900, also referred to as an orchestrator network. Each of the enterprise sites 902 in FIG. 9 references a geo-location, which is at least an approximate indication of location, and may be in the following standard format: (latitude, longitude, altitude), or any other appropriate format. Particularly, Enterprise #1 has a first site 902*a* at geo-location (a,b,c) and second site 902*b* at (p,q,r). Enterprise #2 has a first site 902*c* at geo-location (l,m,n). Enterprise #3 has a plurality of sites 1, 2, 3, and 4, (shown collectively at 902*d*) which are nearby each other and are approximately at geo-location (e,f,g). A plurality of other sites may also be deployed and connected as shown with the others; including a site 902*e* for Enterprise #N at geo-location (x,y,z).

In FIG. 9, we note Enterprise #1 is operating two distinct sites 902*a*, 902*b* in different geographies whereas Enterprise #3 has all 4 sites (902*d*) in the same geo-location. As an example, Enterprise #1 may be a shipping company operating two sites: one in Florida and the other on the coast in California, whereas Enterprise #3 may be a university with four distinct sites within its campus, all in the same block in Colorado Springs, Colo. In this example, it matters that Sites 1 and 2 of Enterprise #1 are tagged differently but the four sites of Enterprise #3 may be tagged with the same geo-location. Enterprise #2 has one site 902*c*, which may be located nearby one of the other sites such as Enterprise #1's first site 902*a* on the coast in California.

The enterprise networks from each of the sites 902 are connected (e.g. via a PDN 910) to the SAS 312, which as described elsewhere, manages the spectrum. The enterprise networks are also connected to the centralized provider network 900 (e.g. via the PDN 910), which can provide a variety of services to the enterprise networks 902. The centralized provider 900 includes a Global Channel Forecasting Module 916, a Global Training/Retraining Module 917, and a central repository (database) 918, all of which are connected within the centralized provider network.

Figure 10:
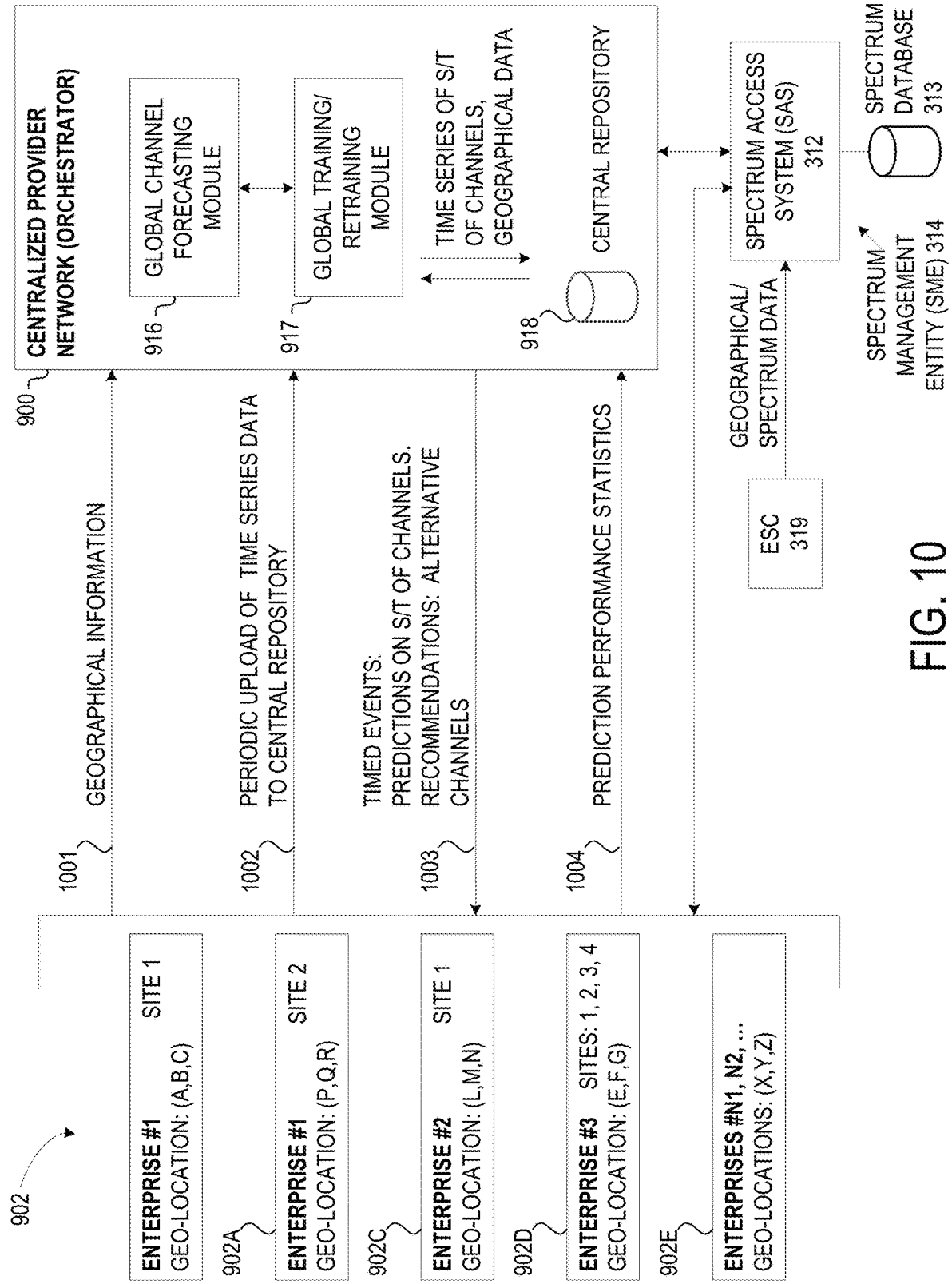
FIG. 10 is a block diagram of enterprise sites and the provider network, showing messages and data flowing between the enterprises and the provider network.

FIG. 10 is a message flow diagram similar to the block diagram of FIG. 9, and showing some messages and data flowing between the enterprises and the central network. A first data flow 1001 provides geographical information, such as the geo-location of each of the enterprises, from the enterprises 902 to the Provider Network 900, which stores them in the Central Repository 918. A second data flow 1002 from the enterprises 902 provides an upload of time series data regarding suspensions/terminations observed within each of the enterprises; this upload may be periodic and provided over time as more data is collected. A third data flow 1003 from the Provider Network 900 provides predictions to each enterprise on suspensions/terminations for each channel being used by each enterprise, and may also provide recommendations and alternative channel possibilities. A fourth data flow 1004 provides prediction performance statistics from each enterprise to the Provider Network 900.

Figure 11:
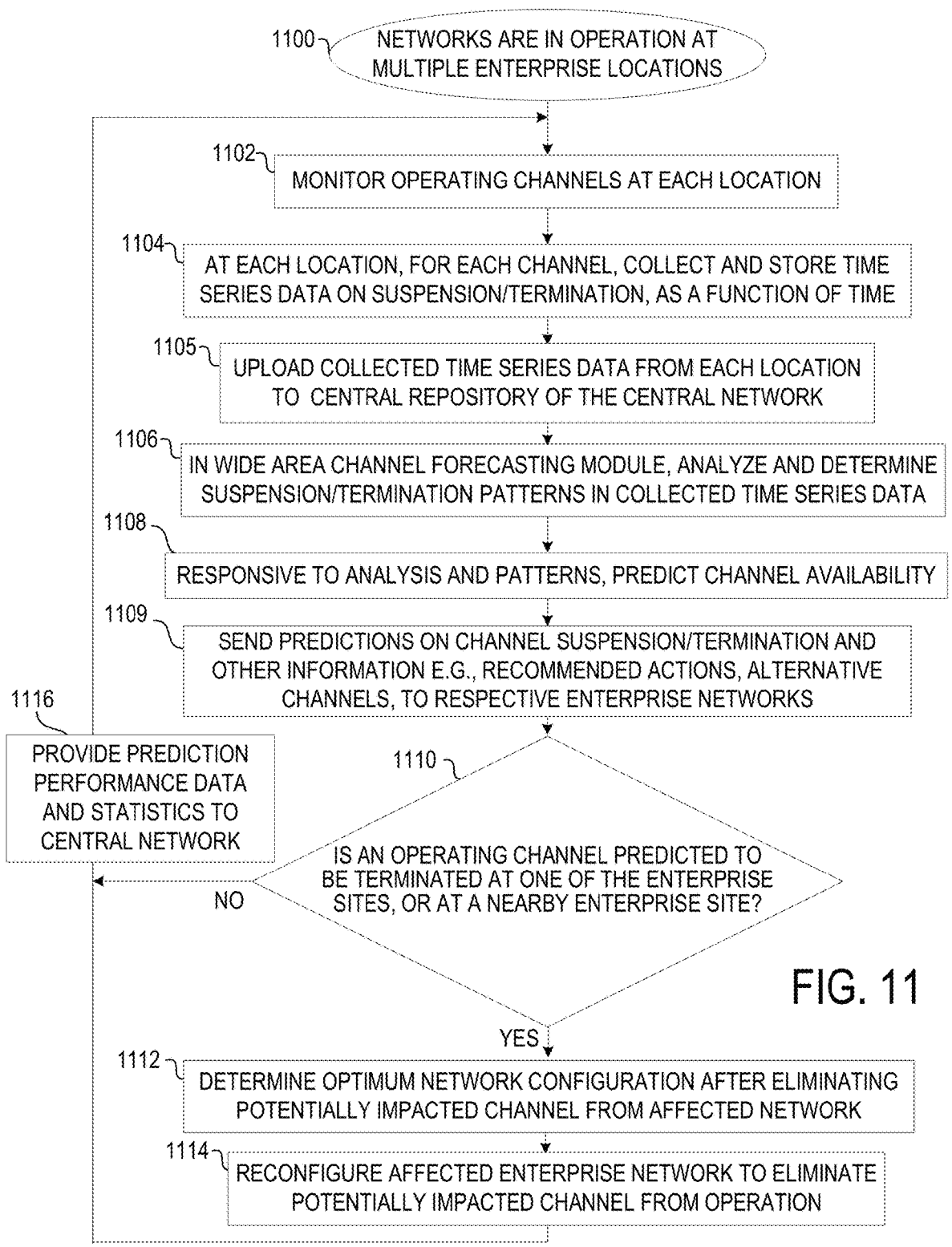
FIG. 11 is a flow chart of operations to monitor channel disruptions at the multiple enterprise locations shown in FIG. 9 over a period of time, predict channel suspension/terminations that may occur in the future, and then provide information to allow the affected network location to preemptively reconfigure the affected network to avoid potential disruption(s) in service.

FIG. 11 is a flow chart of operations to monitor channel disruptions at the multiple enterprise locations shown in FIG. 9 and FIG. 10 over a period of time, predict channel suspension/terminations that may occur in the future, and then provide information to allow the affected network location to preemptively reconfigure the affected network to avoid potential disruption(s) in service.

At the start (STEP 1100), network operations at multiple enterprise locations are in progress: in each respective enterprise the BS/APs are communicating with their respective UEs and the Domain Proxies.

In the next step (STEP 1102) within each network (similar to that described with reference STEP 502) the Domain Proxy and each of the BS/APs monitor operations on each channel operating in the network. In one implementation, each of the BS/APs monitor channel operations, and the BS/APs periodically report back to the Domain Proxy. Particularly, in order to provide data to make predictions regarding channel availability and suspension/termination, the enterprise's operator network monitors the channels being used and utilizes data collection techniques to keep track, over time, of relevant information such as each channel's spectrum availability, the spectrum utilized (requested/granted), and the channels that are suspended/terminated, at an appropriate granular time scale.

In the next step (STEP 1104) the data from each of the BS/APs is collected and stored in an appropriate form, such as in digital form in a database such as the Channel Utilization Database at each enterprise location 902. Particularly, the Domain Proxy at each enterprise deployment 902 (FIG. 9) maintains the respective time series data of channels granted, channels suspended or terminated at appropriate times, in a similar manner as described above with reference to FIG. 8 and STEP 504.

Each Domain Proxy then uploads (STEP 1105) this channel utilization data to the Global Channel Forecasting Module 916 periodically, or at appropriate intervals, or as appropriate. For example, the Domain Proxy may upload this information every 6 hours.

In the global channel forecasting module 916, the uploaded data is analyzed (STEP 1106) using machine learning and AI techniques to find patterns in the collected data, similar to that described in STEP 506. In addition, the global channel forecasting module 916 looks for patterns as a function of geographical location.

Responsive to the found patterns and analysis, the global channel forecasting module predicts (STEP 1108) channel availability for each enterprise location, in a similar manner to that described with respect to STEP 508, and in addition utilizes information from other enterprise locations, particularly geographical proximity, to make predictions responsive to geographical proximity.

(14) Geographical Dependence

Generally, the more granular the geo-location, the better the prediction performance. It is anticipated that CBRS deployments along the coastal areas will witness at various times suspensions or terminations of one or more channels due to increased probability of incumbents operating in those geography. However, if the CBRS deployments happen to be several hundreds of miles away from the coastal regions, the coastal rate of suspensions or terminations for the same channels will be different; most likely either negligible or nonexistent. Hence, specifically, enterprise deployments particularly along the coastal areas should ideally be tagged with accurate geo-locations even if multiple sites within the enterprise are located approximately within the same geographical area.

In the deployment scenario such as shown in FIGS. 9 and 10 where many enterprises are (globally) managed by a single service provider (and therefore the information for all enterprise locations is available to the service provider), the channel forecast accuracy may become better since channel forecasting is done over a larger area, or maybe even on a global scale. If several enterprises, specifically the Domain Proxy from each enterprise, periodically or asynchronously pushes channel utilization information to the global channel forecasting module 916, the increased volume of data may be trained over the larger area (even globally) within the Training & Retraining module 917 to provide greater accuracy.

The global channel forecasting module 916 sends (STEP 1109) prediction information relating to suspension/termination of channels to each appropriate enterprise network, and may also recommend and (also provide a recommendation of which) channels are most appropriate as alternatives, as well as provide other information that may be useful to the enterprise such as likelihood of termination, and so forth.

Each enterprise network then utilizes (STEPS 1110, 1112, 1114) the received information to determine whether or not to terminate an operating channel, and if so, to determine the optimum network configuration after eliminating the potentially impacted channel, and then reconfigures the network accordingly, in a similar manner as described with reference to STEPs 510, 512, and 514.

(15) Performance Feedback

During operation, as illustrated at STEP 1116 (as in STEP 516) each of the enterprises observes and collects data and statistics regarding the accuracy of predictions; particularly how well the predictions for that enterprise correlate with the observed channel availability, and then each of the enterprises transmit back to the global channel forecasting module 916 these performance results, so that the Training & Retraining Module 917 can use the performance results as feedback to improve the accuracy of subsequent predictions.

Capacity Prediction

The inventors have recognized that radio frequency (RF) usage across multiple BS/APs in an enterprise location deployment may vary with some predictably over the course of the day and at different locations, particularly the RF usage may vary according to patterns that are at least somewhat predictable; e.g. at a particular time some BS/APs may be operating at capacity (and therefore the BS/AP(s) likely need more capacity), whereas other BS/APs might have excess capacity that could be advantageously re-allocated to those operating at or near capacity.

Capacity utilization refers to the amount of RF resources actually used by a BS/AP in a time slot versus its provisioned capacity, which is the amount of RF resources provisioned (allocated) to the BS/AP during that time slot. The actual RF usage within a time slot can be measured in a number of ways. In an LTE embodiment for example, the number of physical resource blocks (PRBs), given system bandwidth, is fixed. For 5G NR (fifth generation New Radio), the number of PRBs are based on numerology, but the same principle applies. For example, suppose each BS/AP in the enterprise is allocated a 20 MHz channel by the Domain Proxy. For a 20 MHz system bandwidth, in LTE there are 100 PRBs, the respective BS/AP monitors and keeps track of the average PRB utilization each monitoring interval to determine the actual utilization.

To get a relative utilization of capacity, we can determine the actual utilization of capacity versus the provisioned capacity. Based on the relative capacity utilization, in one embodiment, described with reference to FIG. 14, the BS/AP compares the capacity utilization to a threshold, and then maps it to a corresponding scalar value according to the following mapping:

| | |
|---|---|
| 5: | >=100% CAPACITY WOULD HAVE BEEN NEEDED |
| 4: | >=75% OF CAPACITY USED |
| 3: | >=50% OF CAPACITY USED |
| 2: | >=25% OF CAPACITY USED |
| 1: | <25% OF CAPACITY USED |
| 0: | CELL (BS/AP) NOT USED |

For example, if the system bandwidth of a BS/AP is 20 MHz and if 43% of the PRBs were on average used during a measurement interval, the BS/AP thresholds this to value (=2) using the 0 to 5 scale discussed above.

Figure 12:
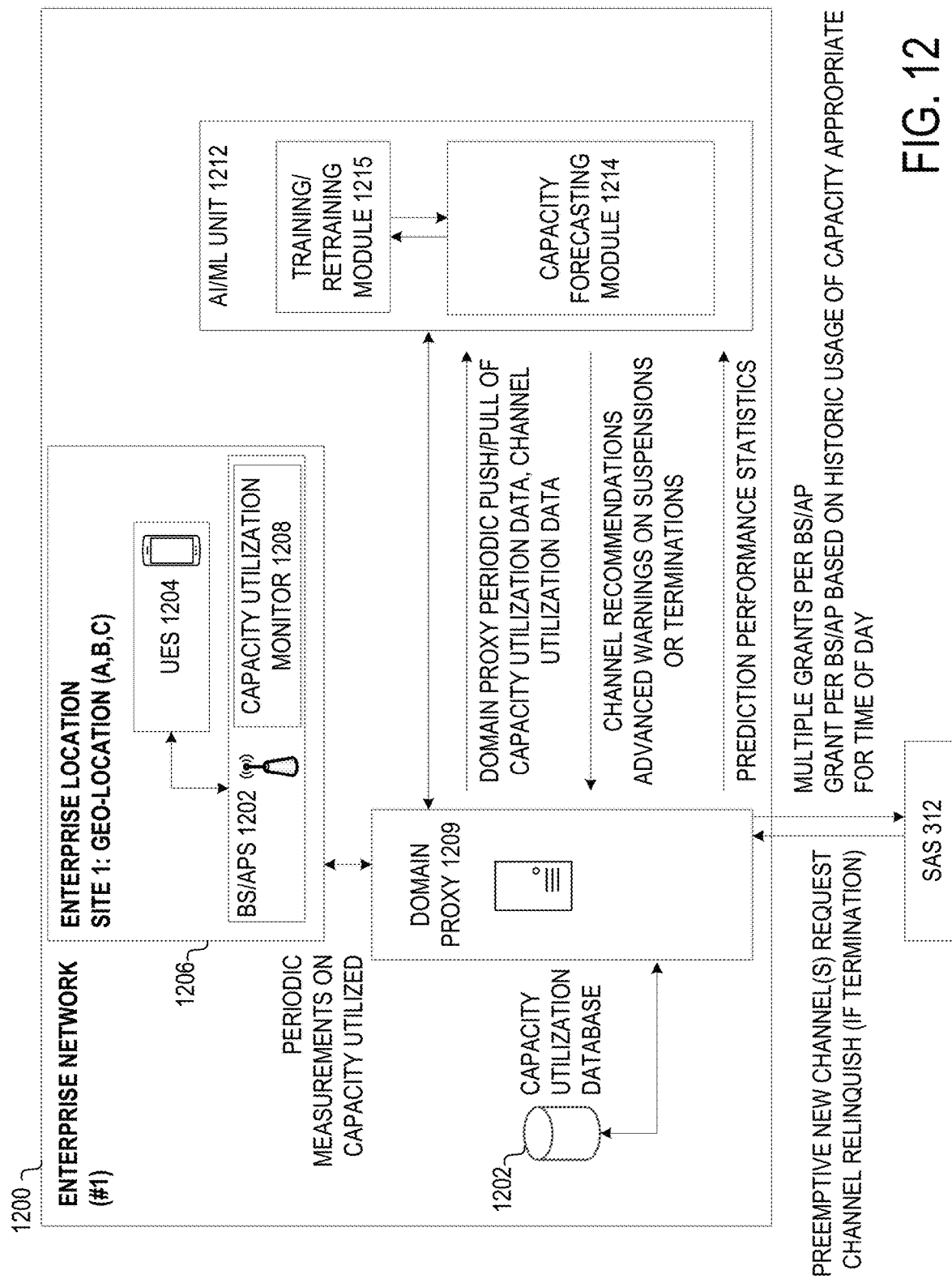
FIG. 12 is a block diagram of a networked system implementing capacity usage prediction, including a capacity utilization monitor for the BS/APS that monitors radio frequency (RF) resource utilization and an AI/ML unit that receives data and makes predictions.
Figure 13:
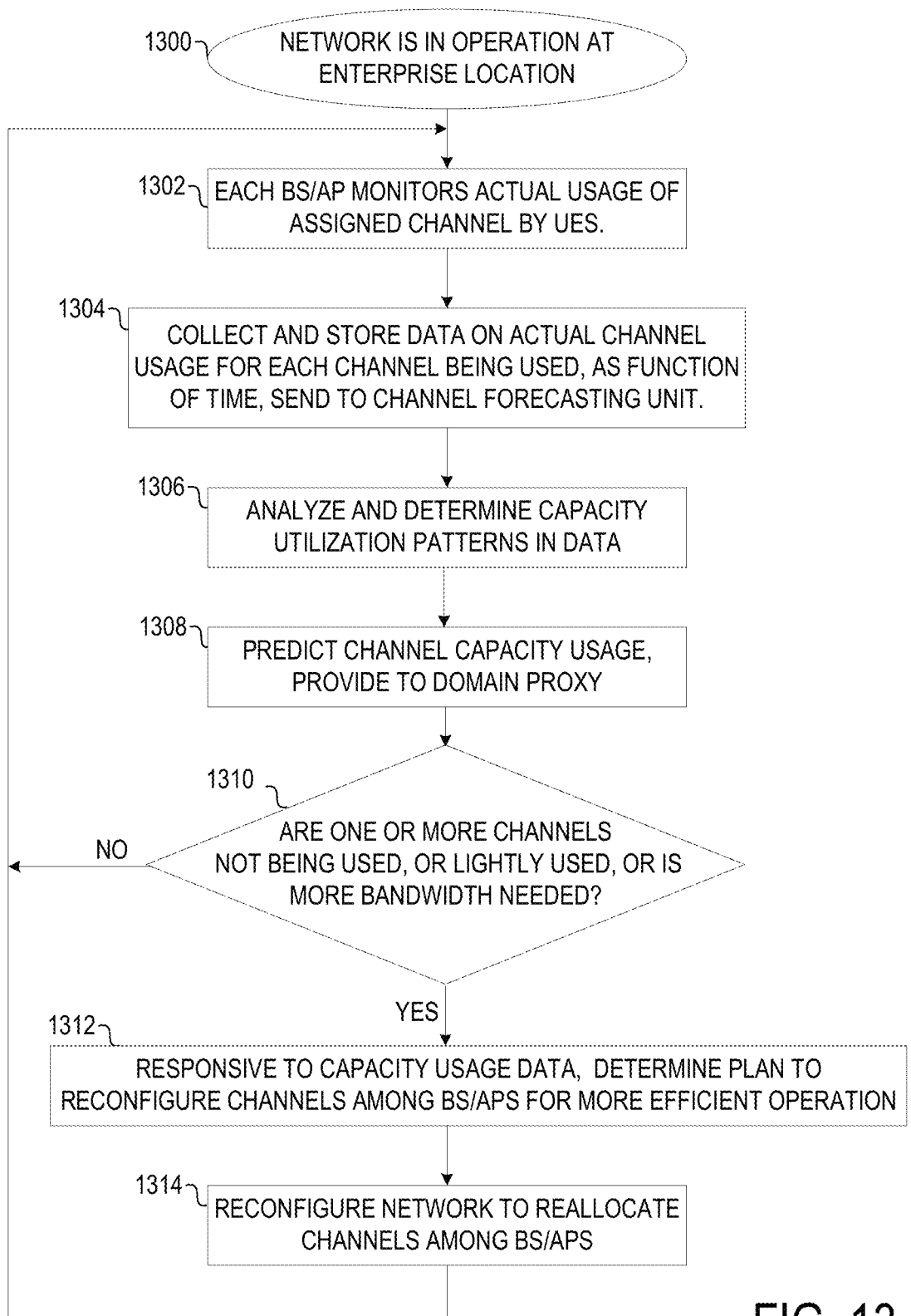
FIG. 13 is a flow chart of operations to monitor usage by the BS/APs in the network, determine utilization of capacity, find utilization patterns, make predictions as to the channel capacity that will be needed in the network, and reconfigure the network accordingly.

FIGS. 12 and 13 describe RF usage monitoring (vs. capacity), prediction, and reconfiguration. FIG. 12 is a block diagram, and FIG. 13 is a flow chart of operations to monitor usage by the BS/APs, determine utilization of capacity vs. provisioned capacity, find patterns, make predictions as to the capacity that will be needed (and should be provisioned), and reconfigure the network accordingly.

FIG. 12 is a block diagram of an Enterprise Network 1200 that implements capacity monitoring, prediction and reconfiguration. As shown in FIG. 12, each of the BS/APs 1202 at a site 1206 has a capacity utilization monitor 1208 that monitors the capacity utilization in its communications with its connected UEs 1204 and any other communications with which it is engaging. This capacity utilization information is then sent to the domain proxy 1209, which stores the data in an appropriate location, such as in the BS/AP Capacity Utilization database 1202 or in another suitable database such as the Channel Utilization Database 802 (FIG. 8). The Domain Proxy 1209 is typically physically located on-site (at or near site 1 at the enterprise location 1206) or may be remote. The Domain Proxy 1209 is connected via an appropriate network connection to an Artificial Intelligence/Machine Learning (AI/ML) Unit 1212, including a Capacity Forecasting Module 1214 and a Training/Retraining Module 1215. In a preferred embodiment, the AI/ML unit 1212 is physically located remotely from the enterprise location 1206 such as in a centralized provider network 900 (see FIG. 10), however in other embodiments it could be located at or near the enterprise location 1206. In embodiments in which both the AI/ML Unit and the Global Forecasting Module 914 and Global Training/Retraining Module 915 are located in the centralized provider network 900 (FIG. 10), the capacity utilization functions may be combined together with the channel availability functions, in order e.g. to provide greater efficiency.

The Capacity Forecasting Module 1214 includes Artificial Intelligence (AI) capabilities such as described above with reference to the Channel Forecasting Module 814 (FIG. 8), including implementation algorithms to forecast capacity based on neural networks. The Capacity Forecasting Module 1214 is connected to a Training/Retraining Module 1215, which includes Machine Learning (ML) capabilities and works cooperatively with the Module 1214, in a manner such as described with reference to the Training/Retraining Module 815 (FIG. 8). The Training/Retraining Module 1215 includes for example deep/reinforcement learning capabilities.

FIG. 13 is a flow chart of operations to monitor usage by the BS/APs, determine capacity utilization, find patterns, make predictions as to the capacity that will be needed, and reconfigure the network accordingly. As the start (STEP 1300) the network is in operation, and then (STEP 1302) each BS/AP monitors actual usage of its respectively assigned channel, or channels. The Domain Proxy 1209 collects and stores (STEP 1304) a time series of data measurements (preferably periodically) of capacity received from the BS/APs 1202. The Domain Proxy 1209 then sends these measurements and other capacity utilization data to the channel forecasting module 1214. In the channel forecasting unit, the received information is used to determine time of day usage patterns and other patterns inferable from the data to identify and predict probability of usage, amount of usage, likelihood of suspension/termination and associated timing, and likelihood of replacement grants.

This information (probability of usage, amount of usage, likelihood of suspension/termination and associated timing, and likelihood of replacement grants) is then sent back to the Domain Proxy 1209. If it appears to the Domain Proxy 1209 (or other element) that one or more channels are not being used effectively (STEP 1310), the network (e.g. the ACS) can determine how to reallocate capacity (STEP 1312) between the BS/APs 1202 to provide better service for the UEs 1204. The network can be reconfigured (e.g. by the domain proxy) (STEP 1314) to reallocate capacity and thereby provide more efficient network operation.

Furthermore, as the operations repeat over an extended period of time, more and more capacity utilization data is provided (STEP 1304) by the Domain Proxy to the Capacity Forecasting Module 1214, the Training & Retraining module 1215, which can use this capacity utilization information (STEPS 1306, 1308) to determine how accurate its predictions have been, and use this feedback to revise and/or retrain the models used in the Capacity Forecasting Module 1214, and thereby improve its predictions.

Thus, from a general viewpoint of utilizing the predictions and reallocating channels, there can be a plurality of grants of differing sizes per BS/AP utilized and reallocated throughout the network over time, and there will be a perceived abundance of spectrum available for the enterprise.

(16) Data Example

Figure 14:
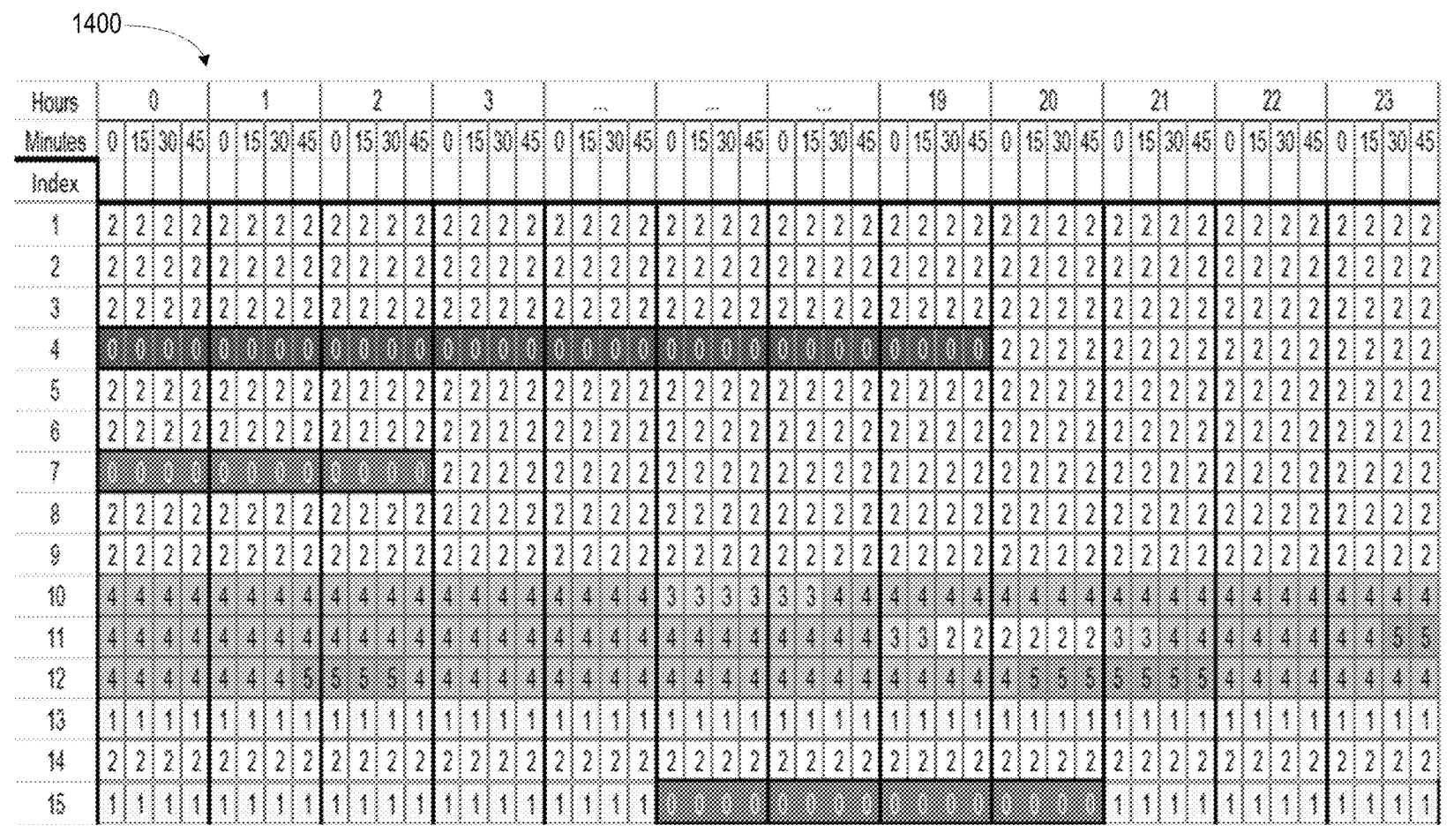

FIG. 14 is a data chart 1400 showing one example data set of capacity utilization within an enterprise over a period of time, showing channel indexes in rows, and time intervals in columns. In this example there are fifteen BS/APs, each assigned to a different channel (shown as indexes in rows 1-15), and each hour of operation is divided in columns into four equal monitoring slots (i.e., fifteen minutes per time slot). Measurements for an arbitrarily chosen 24-hour period are shown in this figure. In this example the values (5, 4, 3, 2, 1, 0) in the table are scalar values representing the actual capacity (vs provisioned capacity) that was utilized within each 15-minute slot of the hour. Particularly, in this example "5" indicates that greater than or equal to 100% capacity would have been needed within this time slot; "4" indicates that 75% capacity or more (but less than 100%) was used; "3" indicates that 50% or more (but less than 75%); "2" indicates that 25% or more (but less than 50%) was used; "1" indicates that some capacity, but less than 25% was used; and "0" indicates that the BS/AP was not used at all within the time slot. In one example if the system bandwidth of a BS/AP is 20 MHz and if 43% of the PRBs were on average used during a measurement interval, the BS/AP thresholds this to value (=2) using the 0 to 5 scale discussed above. In other embodiments, different data representations may be implemented.

The above example assigned each BS/AP to a single channel, in other embodiments, one BS/AP or more may be assigned to multiple (two or more) channels. Also, in other embodiments, one or more of the channels may not be used during one or more time slots.

(17) Data Analysis and Reallocation

Returning to FIG. 14, we note that BS/AP #1 has on average seen between 25% and 50% of its capacity utilized throughout the 24-hour period. Similarly, BS/AP #12 has utilized 100% of its capacity during the 20th and 21st hour, which means that a higher capacity likely was needed during those time slots, and would have been useful to improve performance. It is also relevant to note from the exemplary data in FIG. 14 that eight out of the fifteen BS/APs utilized less than 50% of their provisioned capacity over the 24-hour interval. If such measurements are available as a time series for a longer duration (e.g., several weeks to months), trendlines may be determined using this longer duration time series, and a confidence level for each BS/AP may be generated as to its actual demand per measurement interval as a function of time of day.

For example, if the trend exhibited in FIG. 14 continues, it would be very inefficient to assign a 20 MHz spectrum for BS/APs ##1, 2, 3, 5, 6, 8, 9 and 14, because a lesser amount of spectrum (e.g., 10 MHz) for each would have been more than sufficient. In such scenarios, the Domain Proxy 1209 has an additional degree of freedom. For example, Domain Proxy 1209 could apply for two grants each of 10 MHz wide, instead of one grant that is 20 MHz wide for BS/AP #1. In such scenarios, the two grants provide greater flexibility and would provide an advantage: if one of the 10 MHz grants were to be suspended or terminated, then the other 10 MHz would be readily available and usable, whereas if the entire grant was 20 MHz, the entire 20 MHz would have to be relinquished. This is particularly useful for example, if BS/AP #1 is installed in an area where the density of users is significantly lower than the rest of the enterprise and in such cases, assigning a large spectrum (e.g. 20 MHz) for BS/AP #1 would most likely be inefficient and provide little or no benefit.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for predicting utilization of capacity and preemptively re-allocating channels in a spectrum-controlled wireless communication network that includes a plurality of Base Stations/Access Points (BS/APs) located within an enterprise location, the BS/APs communicating with a plurality of User Equipment devices (UEs) on a plurality of wireless channels granted by a spectrum control entity, the channels provisioned among the BS/APs in the network, comprising the steps of:
   monitoring radio frequency (RF) usage in each of said BS/APs over a period of time and collecting time series RF usage data;
   determining capacity utilization data for each of said BS/APs responsive to the RF usage data and the channels provisioned respectively to each of said BS/APs;
   identifying patterns in said capacity utilization data using Artificial Intelligence (AI) techniques;
   responsive to said identified patterns, predicting utilization of capacity for each of said BS/APs over a prediction time period using AI techniques;
   responsive to said capacity utilization predictions, re-organizing the network channels to provide a network configuration plan that re-distributes the channels over said prediction time period; and
   pre-emptively reallocating network channels responsive to said network configuration prior to said prediction time period to reconfigure the network to efficiently utilize capacity during said prediction time period;
   wherein the wireless network operates on the Citizen's Broadband Radio Service (CBRS band), and the BS/APs comprise CBRS Devices (CBSDs) that are located at the enterprise location and form part of an enterprise network and the spectrum control entity is a Spectrum Access System (SAS).

2. The method of claim 1 wherein said step of predicting utilization of capacity includes generating models that are used to make predictions, and further comprising the steps of:
   providing feedback data regarding prediction accuracy; and
   utilizing said feedback data in a machine learning process to modify said models and thereby provide greater prediction accuracy.

3. The method of claim 1 further comprising a plurality of spectrum-controlled wireless communication networks operating a corresponding plurality of enterprise network locations, and further comprising the steps of:
   providing utilization of capacity data for each of said enterprise networks to a centralized provider network;
   analyzing the utilization of capacity data using AI techniques to determine capacity utilization patterns;
   predicting capacity utilization for each of said BS/APs at each of said enterprise locations responsive to said capacity utilization patterns using AI techniques; and
   providing said capacity utilization predictions respectively to each of said enterprise networks.

4. A method for predicting utilization of capacity and preemptively re-allocating channels in a spectrum-controlled wireless communication network that includes a plurality of Base Stations/Access Points (BS/APs) located within an enterprise location, the BS/APs communicating with a plurality of User Equipment devices (UEs) on a plurality of wireless channels granted by a spectrum control entity, the channels provisioned among the BS/APs in the network, comprising the steps of:
   monitoring radio frequency (RF) usage in each of said BS/APs over a period of time and collecting time series RF usage data;
   determining capacity utilization data for each of said BS/APs responsive to the RF usage data and the channels provisioned respectively to each of said BS/APs;
   identifying patterns in said capacity utilization data using Artificial Intelligence (AI) techniques;
   responsive to said identified patterns, predicting utilization of capacity for each of said BS/APs over a prediction time period using AI techniques;
   responsive to said capacity utilization predictions, re-organizing the network channels to provide a network configuration plan that re-distributes the channels over said prediction time period; and
   pre-emptively reallocating network channels responsive to said network configuration prior to said prediction time period to reconfigure the network to efficiently utilize capacity during said prediction time period;
   wherein:
   said step of predicting capacity utilization includes predicting a capacity utilization over each of a plurality of time slots;
   said step of pre-emptively reallocating network channels includes reallocating said channels in said plurality of time slots; and
   said step of predicting utilization of capacity includes predicting at least one of probability of usage, amount of usage, likelihood of suspension/termination and associated timing, and likelihood of replacement grants.

5. An apparatus for predicting utilization of capacity and allocating channels in a spectrum-controlled wireless communication network that includes a plurality of Base Stations/Access Points (BS/APs) located within an enterprise location of an enterprise network, the BS/APs communicating with a plurality of User Equipment devices (UEs) on a plurality of wireless channels, comprising:
  a capacity utilization database for storing data regarding capacity utilization at the enterprise location;
  a capacity forecasting module including Artificial Intelligence (AI), said module connected to the capacity utilization database and configured to identify patterns in the capacity utilization data and predict capacity utilization responsive to said identified patterns;
  a self-organizing network element connected to receive the capacity utilization predictions, and configured to reorganize the channels among the BS/APs responsive to their predicted capacity utilization, to provide a network reconfiguration plan predicted to efficiently utilize capacity during said prediction time period; and
  a domain proxy configured to pre-emptively re-allocate channels among the BS/APs responsive to said network reconfiguration.

6. The apparatus of claim 5 wherein said capacity forecasting module is configured to predict capacity utilization over each of a plurality of time slots.

7. The apparatus of claim 5 wherein said capacity utilization module is configured to generate models that are used to make predictions, and further comprising a Training/Retraining Module including machine learning configured to receive feedback data regarding prediction accuracy and utilize said feedback data to modify said models and thereby provide greater prediction accuracy.

8. The apparatus of claim 5 wherein the wireless communication network is configured to operate as a Citizen's Broadband Radio Service (CBRS) system, and the BS/APs comprise CBRS Devices (CBSDs) that are located at an enterprise location.

9. The apparatus of claim 5 wherein the capacity utilization module is located remotely from the enterprise location.

10. A method for predicting capacity utilization at a centralized provider network to allocate channels in a plurality of spectrum-controlled wireless communication networks, each wireless communication network including a plurality of Base Stations/Access Points (BS/APs) communicating with a plurality of User Equipment devices (UEs) on a plurality of wireless channels at an enterprise location, comprising the steps of:
  receiving utilization of capacity time series data from each of said enterprise networks;
  analyzing the utilization of capacity data using AI techniques to determine capacity utilization patterns as a function of geographical location;
  predicting capacity utilization respectively for said BS/APs at said enterprise locations responsive to said capacity utilization patterns using AI techniques, including predicting capacity utilization for said BS/APs over a prediction time period using AI techniques; and
  providing said predicted capacity utilization information respectively to each of said enterprise networks for reconfiguring their networks to efficiently utilize capacity during said prediction time period;
  wherein each of said wireless communication networks operate on the Citizen's Broadband Radio Service (CBRS) band, and the BS/APs comprise CBRS Devices (CBSDs) that are located at an enterprise location and form part of an enterprise network.

11. The method of claim 10 further comprising, in each of said networks, re-organizing the network channels responsive to said predicted capacity utilization to provide a reconfigured network plan; and pre-emptively re-allocating channels responsive to said reconfigured network plan.

12. The method of claim 11 wherein said step of predicting capacity utilization includes predicting a capacity utilization over each of a plurality of time slots, and said step of pre-emptively reallocating network channels includes reallocating said channels in said plurality of time slots.

13. The method of claim 10 wherein said step of predicting capacity utilization includes generating models that are used to make predictions, and further comprising the steps of:
  receiving feedback data from the wireless communication networks regarding prediction accuracy; and
  utilizing said feedback data in a machine learning process to modify said models and thereby provide greater prediction accuracy.

* * * * *